(12) United States Patent
Hamada

(10) Patent No.: US 11,364,922 B2
(45) Date of Patent: Jun. 21, 2022

(54) DRIVING ASSISTANCE DEVICE, DRIVING ASSISTANCE METHOD, AND COMPUTER READABLE MEDIUM

(71) Applicant: Mitsubishi Electric Corporation, Tokyo (JP)

(72) Inventor: Yuji Hamada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 185 days.

(21) Appl. No.: 16/482,348

(22) PCT Filed: Mar. 7, 2017

(86) PCT No.: PCT/JP2017/009068
§ 371 (c)(1),
(2) Date: Jul. 31, 2019

(87) PCT Pub. No.: WO2018/163296
PCT Pub. Date: Sep. 13, 2018

(65) Prior Publication Data
US 2020/0047768 A1    Feb. 13, 2020

(51) Int. Cl.
*B60W 50/02* (2012.01)
*B60W 30/09* (2012.01)
*G05D 1/00* (2006.01)

(52) U.S. Cl.
CPC ........ *B60W 50/0205* (2013.01); *B60W 30/09* (2013.01); *G05D 1/0088* (2013.01); *B60W 2050/0215* (2013.01); *B60W 2554/00* (2020.02)

(58) Field of Classification Search
CPC ............. B60W 50/0205; B60W 30/09; B60W 2554/00; B60W 2050/0215;
(Continued)

(56) References Cited

U.S. PATENT DOCUMENTS 6,437,688 B1 * 8/2002 Kobayashi ............ G01S 15/931
180/167
9,079,587 B1 * 7/2015 Rupp .................... G05D 1/0289
(Continued)

FOREIGN PATENT DOCUMENTS

DE          10027168 A1 *  3/2001  ........... G05D 1/0295
DE          19902939 B4 *  1/2015  ............... G01D 3/08
(Continued)

OTHER PUBLICATIONS

Wikipedia, ISO 26262 page (Year: 2021).*
(Continued)

*Primary Examiner* — Sze-Hon Kong
*Assistant Examiner* — Tanya C Sienko
(74) *Attorney, Agent, or Firm* — Sughrue Mion, PLLC; Richard C. Turner

(57) ABSTRACT

A driving assistance device (10) is mounted in a mobile body (100). An abnormality detection unit (22) detects an abnormality in a sensor mounted in a peripheral body moving on a periphery of the mobile body (100). An assistance determination unit (23) reads a control pattern corresponding to a sensing area of a sensor whose abnormality has been detected by the abnormality detection unit (22), from a pattern storage unit (31). A path generation unit (24) generates path data indicating a moving path of the mobile body (100) to correspond to the control pattern.

12 Claims, 18 Drawing Sheets

(58) Field of Classification Search
CPC ....... B60W 2540/10; B60W 2540/103; B60W 10/06; B60W 50/023; B60W 2030/1809; B60W 50/029; B60W 10/02; B60W 10/11; B60W 60/0016; B60W 30/18163; B60W 30/18072; G05D 1/0088; G08G 1/09; G08G 1/16
See application file for complete search history.

(56) References Cited

U.S. PATENT DOCUMENTS

| | | | | |
|---|---|---|---|---|
| 9,956,974 | B2* | 5/2018 | Cooper | B61C 17/12 |
| 2007/0021880 | A1* | 1/2007 | Appleby | G05D 1/0088 |
| | | | | 701/23 |
| 2009/0326819 | A1 | 12/2009 | Taguchi | |
| 2010/0063673 | A1* | 3/2010 | Anderson | G05D 1/00 |
| | | | | 701/1 |
| 2015/0025708 | A1* | 1/2015 | Anderson | A61B 5/02055 |
| | | | | 340/463 |
| 2015/0094944 | A1* | 4/2015 | Baumann | G05D 1/0291 |
| | | | | 701/408 |
| 2016/0347310 | A1* | 12/2016 | Moran | G05D 1/0276 |
| 2016/0362048 | A1* | 12/2016 | Matthews | G08G 1/163 |
| 2017/0036673 | A1* | 2/2017 | Lee | A61B 3/112 |
| 2017/0072967 | A1* | 3/2017 | Fendt | B60W 10/18 |
| 2017/0139411 | A1* | 5/2017 | Hartung | H04L 12/40 |
| 2017/0248950 | A1* | 8/2017 | Moran | G08G 1/166 |
| 2017/0259820 | A1 | 9/2017 | Takahashi | |
| 2018/0237012 | A1* | 8/2018 | Jammoussi | G01C 21/3415 |

FOREIGN PATENT DOCUMENTS

| | | | | |
|---|---|---|---|---|
| JP | 2000-099890 A | | 4/2000 | |
| JP | 2000-330637 A | | 11/2000 | |
| JP | 2008-225583 A | | 9/2008 | |
| KR | 20170016174 A | * | 2/2017 | ............. B60K 28/02 |
| WO | 2016/038931 A1 | | 3/2016 | |

OTHER PUBLICATIONS

International Search Report for PCT/JP2017/009068, dated Jun. 6, 2017.
Office Action dated Apr. 30, 2021 issued by the Chinese Patent Office in Chinese Application No. 201780087488.8.
Communication dated Oct. 20, 2021 from the China National Intellectual Property Administration in Chinese Application No. 201780087488.8.

* cited by examiner

Fig. 3

| SENSING AREA | ASSISTANCE METHOD | MOVING PLACE | ASSISTANCE TIMING |
|---|---|---|---|
| FRONT (SAME LANE) | TO SUBSTITUTIONALLY GENERATE MOVING PATH | FRONT, SAME LANE | AT ALL TIMES |
| FRONT (LEFT) | TO PROVIDE SENSING DATA | FRONT, LEFT LANE | LEFT TURN, LANE CHANGE, CURVE |
| FRONT (RIGHT) | | FRONT, RIGHT LANE | RIGHT TURN, LANE CHANGE, CURVE |
| REAR (SAME LANE) | | ADJACENT LANE | REVERSE DRIVING |
| REAR (LEFT) | | REAR, LEFT LANE | LEFT TURN, LANE CHANGE |
| REAR (RIGHT) | TO PREVENT PERIPHERAL BODY FROM ENTERING SENSING AREA | REAR, RIGHT LANE | RIGHT TURN, LANE CHANGE |
| SIDE (LATERAL) | | ADJACENT LANE | RIGHT/LEFT TURN, LANE CHANGE |
| SIDE (FRONT) | | ADJACENT LANE | RIGHT/LEFT TURN, LANE CHANGE |
| SIDE (REAR) | | ADJACENT LANE | RIGHT/LEFT TURN, LANE CHANGE |

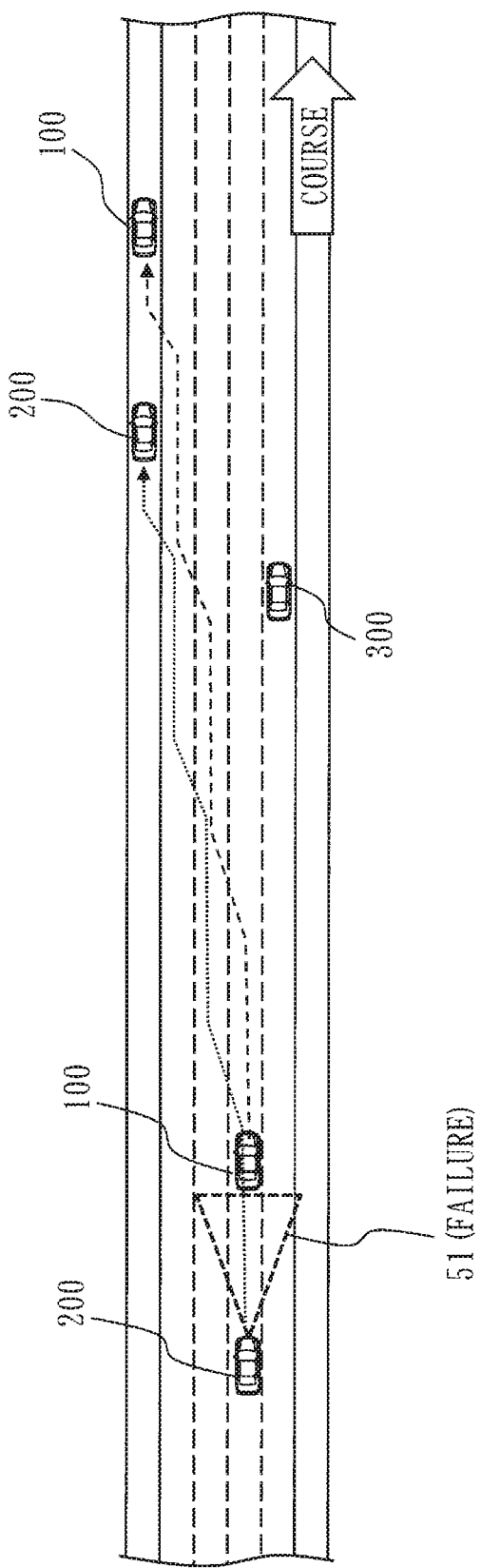

Fig. 10

| INDETECTABLE RANGE | NUMBER OF NECESSARY GUIDING CARS |
|---|---|
| 0° ~45° | 1 OR MORE~ |
| 45° ~90° | 2 OR MORE~ |
| 90° ~180° | 3 OR MORE~ |
| 180° ~360° | 4 OR MORE~ |
| 1 LANE (FRONT OR REAR) | 1 OR MORE~ |
| 2 LANES (FRONT OR REAR) | 2 OR MORE~ |
| 3 LANES (FRONT OR REAR) | 3 OR MORE~ |

Fig. 11

| TYPE OF SENSOR | DIRECTION | ASSISTANCE METHOD | MOVING PLACE | ASSISTANCE TIMING |
|---|---|---|---|---|
| MILLIMETER WAVE | FRONT | TO SUBSTITUTIONALLY GENERATE MOVING PATH | FRONT, SAME LANE | AT ALL TIMES |
| CAMERA | FRONT | | | |
| LiDAR | ALL AROUND | | | |
| LiDAR | FRONT | | | |
| MILLIMETER WAVE | REAR, SIDE | TO PROVIDE SENSING DATA | REAR, ADJACENT LANE | RIGHT/LEFT TURN, LANE CHANGE, CURVE |
| CAMERA | REAR, SIDE | | | |
| LiDAR | SIDE | | | |
| LiDAR | REAR | | | |
| SONAR | SIDE | | | |
| CAMERA | REAR | TO PREVENT PERIPHERAL BODY FROM ENTERING SENSING AREA | ADJACENT LANE | NOTIFY FOR REVERSE DRIVING |

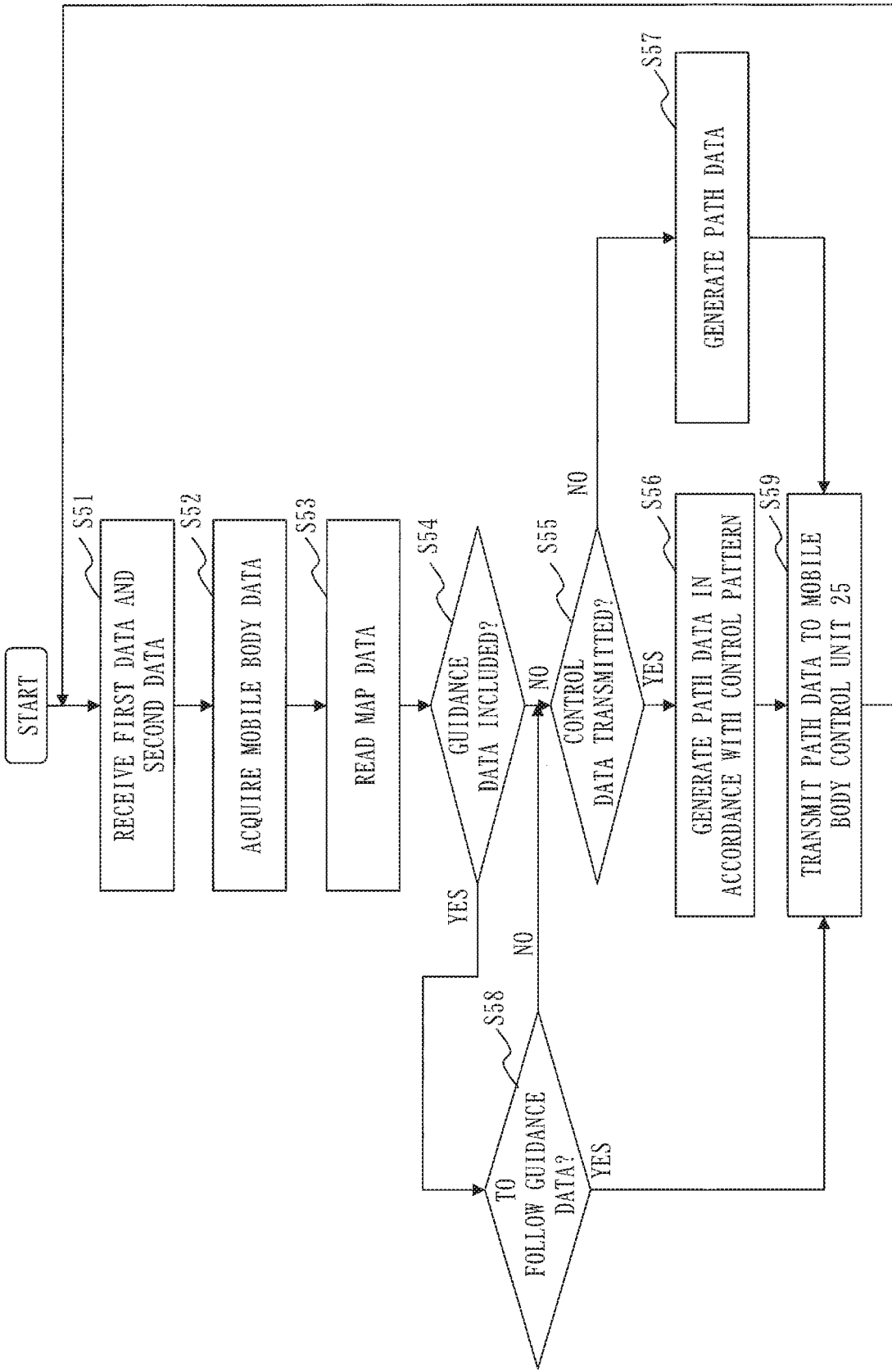

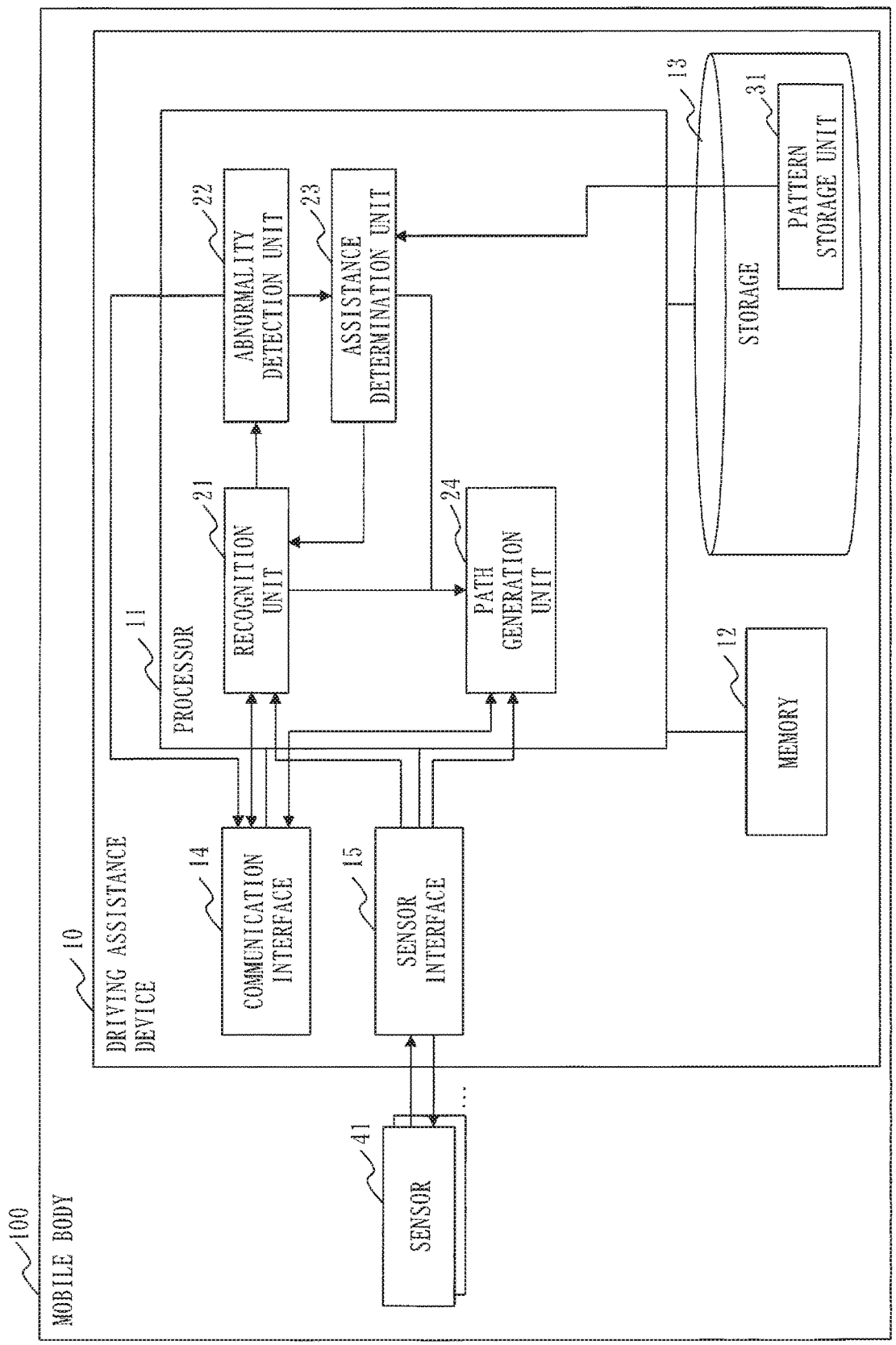

DRIVING ASSISTANCE DEVICE, DRIVING ASSISTANCE METHOD, AND COMPUTER READABLE MEDIUM

CROSS REFERENCE TO RELATED APPLICATIONS

This application is a National Stage of International Application No. PCT/JP2017/009068 filed Mar. 7, 2017.

TECHNICAL FIELD

The present invention relates to a technology which, when an abnormality occurs in a sensor that recognizes a periphery of a mobile body, continues driving assistance such as autonomous driving by cooperating with a peripheral body moving on a periphery of the mobile body.

BACKGROUND ART

Research and development have been conducted on an autonomous driving system that utilizes map information and a sensor such as a camera and a millimeter-wave radar, which is mounted in a mobile body such as a vehicle. Functions such as autonomous emergency braking (AEB) for avoiding collision with an obstacle in front, adaptive cruise control (ACC) for following a vehicle in front, and a lane keeping system (LKS) for traveling to keep a cruising lane have been commercialized.

The basic operation of the autonomous driving system is to cause a mobile body to move to a destination autonomously. However, in cases where an abnormality occurs in a sensor and in cases where a road map is not available, it is difficult to continue autonomous driving.

Patent Literature 1 describes a case wherein when a sensor of a vehicle on a traveling direction side fails, the vehicle communicates with a vehicle in front so that a sensor of the vehicle in front on a counter-traveling direction side operates as a substitute for the failed sensor. This enables autonomous driving even when the sensor of the vehicle on the traveling direction side fails.

CITATION LIST

Patent Literature

Patent Literature 1: JP 2000-330637 A

SUMMARY OF INVENTION

Technical Problem

In Patent Literature 1, information of a sensing area of the sensor which failed is detected by the sensor of the vehicle in front. However, there is a case where only the information of the sensing area of the failed sensor is not sufficient enough to continue the autonomous driving. Moreover, when a vehicle that cannot sense the sensing area of the failed sensor cuts in, information of the sensing area of the failed sensor cannot be acquired.

The present invention has as its objective to perform appropriate control when an abnormality occurs in a sensor.

Solution to Problem

A driving assistance device according to the present invention includes:

an abnormality detection unit to detect an abnormality in a sensor mounted in a peripheral body moving on a periphery of a mobile body; and a path generation unit to generate path data indicating a moving path of the mobile body to correspond to a sensing area of a sensor whose abnormality has been detected by the abnormality detection unit.

Advantageous Effects of Invention

According to the present invention, path data indicating a moving path of a mobile body is generated to correspond to a sensing area of a sensor whose abnormality has been detected, of a peripheral body. Thus, it is possible to perform appropriate control such as detecting an area that is a blind spot of the peripheral body and preventing another mobile body from entering the area that is the blind spot.

BRIEF DESCRIPTION OF DRAWINGS

FIG. 3 is a diagram explaining control patterns stored in a pattern storage unit 31 according to Embodiment 1.

FIG. 4 is a diagram explaining an operation example of the driving assistance device 10 according to Embodiment 1.

FIG. 10 is a diagram illustrating the number of vehicles necessary for assistance according to Modification 1.

FIG. 11 is a diagram explaining control patterns stored in the pattern storage unit 31 according to Modification 2.

FIG. 12 is a flowchart of an overall operation of the driving assistance device 10 according to Modification 3.

FIG. 13 is a configuration diagram of the driving assistance device 10 according to Modification 6.

DESCRIPTION OF EMBODIMENTS

Embodiment 1

*Description of Configuration*

A configuration of a driving assistance device 10 according to Embodiment 1 will be described referring to FIG. 1.

Figure 1:
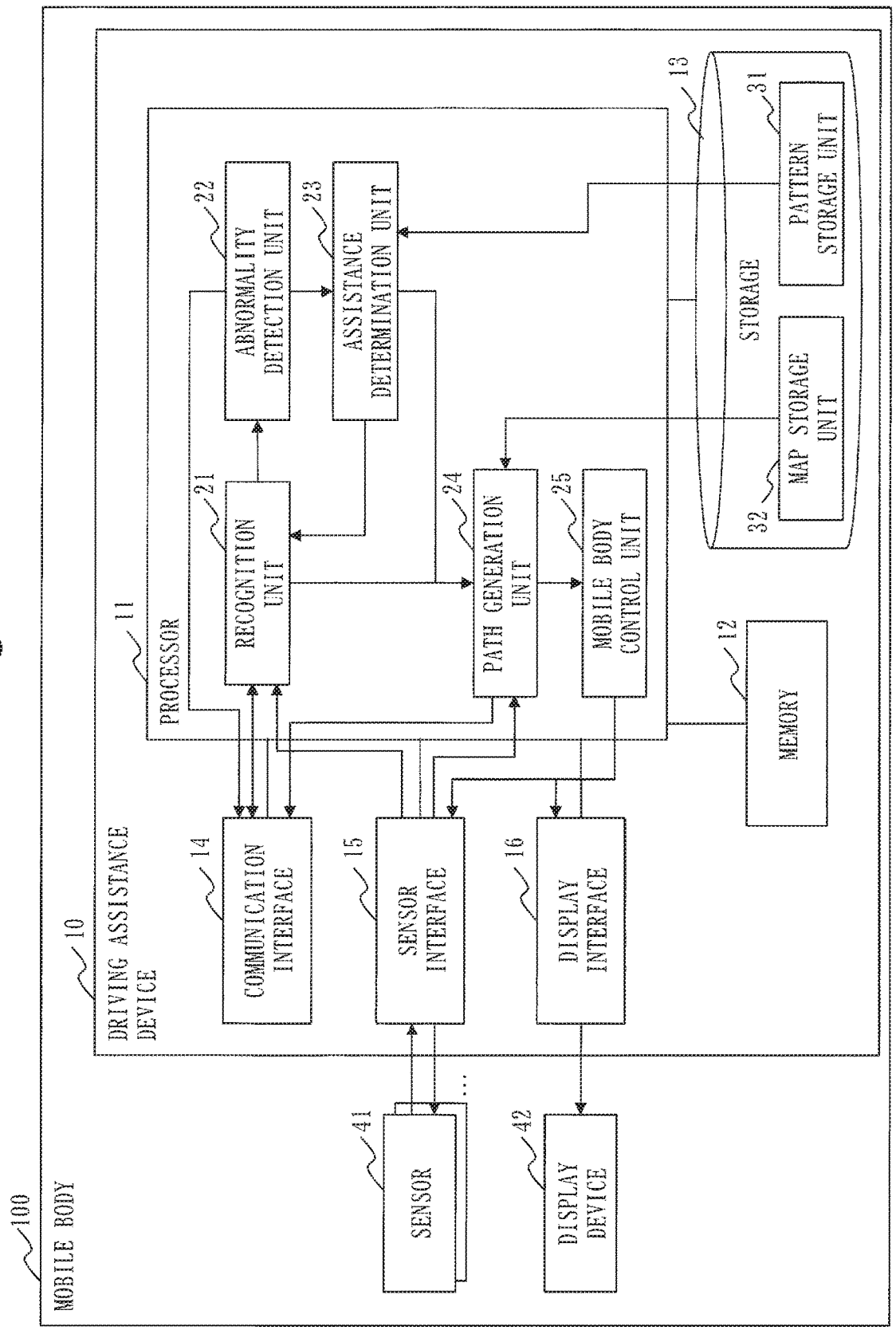
FIG. 1 is a configuration diagram of a driving assistance device 10 according to Embodiment 1.

FIG. 1 illustrates a state wherein the driving assistance device 10 is mounted in a mobile body 100. The mobile body 100 is a vehicle, a vessel, or the like. In Embodiment 1, the mobile body 100 is a vehicle. In the case of Embodiment 1, the mobile body 100 is a vehicle capable of autonomous driving. The mobile body 100 may be capable of both autonomous driving and driver-conducted driving. That is, the mobile body 100 is a vehicle in which an accelerator, a brake, and a steering wheel are automatically controlled partially or entirely.

Note that the driving assistance device 10 may be implemented in an integral mode or inseparable mode to be integral with or inseparable from the mobile body 100 or another illustrated constituent element, or may be implemented in a removable mode or separable mode to be removable or separable from the mobile body 100 or another illustrated constituent element.

The driving assistance device 10 is a computer.

The driving assistance device 10 is provided with hardware devices which are a processor 11, a memory 12, a storage 13, a communication interface 14, a sensor interface 15, and a display interface 16. The processor 11 is connected to the other hardware devices via signal lines and controls these other hardware devices.

The processor 11 is an integrated circuit (IC) which performs computation processing such as data transmission, calculation, processing, control, and management based on an instruction set described in a program. The processor 11 is formed of a register for storing instructions and information, a peripheral circuit, and so on. Specific examples of the processor 11 are a central processing unit (CPU), a digital signal processor (DSP), and a graphics processing unit (GPU).

The memory 12 is a storage device that stores data temporarily. Specific examples of the memory 12 are a static random access memory (SRAM) and a dynamic random access memory (DRAM).

The storage 13 is a storage device that stores data. Specific examples of the storage 13 are a ROM, a flash memory, and a hard disk drive (HDD). The storage 13 may be a portable storage medium such as a secure digital (SD; registered trademark) memory card, a compact flash (CF), a NAND flash, a flexible disk, an optical disk, a compact disk, a blu-ray (registered trademark) disk, and a digital versatile disk (DVD).

The communication interface 14 is an interface to communicate with an external device such as a peripheral body which is another mobile body moving on the periphery of the mobile body 100. Specific examples of the communication interface 14 are a port of an Ethernet (registered trademark), a port of a controller area network (CAN), a port of an RS232C, and a port of a universal serial bus (USB).

The communication interface 14 may use a communication protocol such as a dedicated short range communication (DSRC) for vehicle communication exclusively and IEEE 802.11p. The communication interface 14 may use a mobile telephone network such as long term evolution (LTE), and 4G. The communication interface 14 may also use Bluetooth (registered trademark) or a wireless LAN such as IEEE 802.11a/b/g/n. The communication interface 14 may be oriented to either a mobile telephone network or a wireless LAN, or may be oriented to both of them for using either one by switching or both of them simultaneously.

The communication interface 14 is used when performing wireless communication between the mobile body 100 and a peripheral body, and performs wireless communication between the mobile body 100 and a road-side apparatus, a base station, a server, or an infrastructure. The mobile body 100 and the peripheral body may communicate directly or via facilities such as the road-side apparatus and the base station. The mobile body 100 and the peripheral body may communicate at an arbitrary interval such as 100 ms, 1 minute, and several minutes, or may communicate when there is a demand.

The sensor interface 15 is an interface to acquire data from a sensor 41 mounted in the mobile body 100. Specific examples of the sensor interface 15 are a sensor-data-acquiring large scale integration (LSI) and a port of a universal serial bus (USB).

Examples of the sensor 41 are a millimeter-wave radar, a monocular camera, a stereo camera, light detection and ranging or laser imaging detection and ranging (LiDAR), a sonar, a positioning sensor such as a global positioning system (GPS) and the like, a speed sensor, an acceleration sensor, an azimuth sensor, electric power steering (EPS), and an in-vehicle engine control unit (ECU).

The display interface 16 is an interface to output data to a display device 42 such as a liquid crystal display (LCD). Specific examples of the display interface 16 are ports of a digital visual interface (DVI), ports of D-subminiature (D-SUB), and ports of a high-definition multimedia interface (HDMI™; registered trademark).

The driving assistance device 10 is provided with constituent elements which are a recognition unit 21, an abnormality detection unit 22, an assistance determination unit 23, a path generation unit 24, and a mobile body control unit 25. The functions of the recognition unit 21, abnormality detection unit 22, assistance determination unit 23, path generation unit 24, and mobile body control unit 25 are implemented by software.

A program to realize the functions of the recognition unit 21, abnormality detection unit 22, assistance determination unit 23, path generation unit 24, and mobile body control unit 25 is stored in the storage 13. This program is loaded to the memory 12 by the processor 11 and executed by the processor 11. Thus, the functions of the recognition unit 21, abnormality detection unit 22, assistance determination unit 23, path generation unit 24, and mobile body control unit 25 are implemented.

The storage 13 implements functions of a pattern storage unit 31 and map storage unit 32.

Control patterns for cases where an abnormality occurs in a sensor mounted in a peripheral body moving on the periphery of the mobile body 100 are stored in the pattern storage unit 31 in units of sensing area of the sensor in which the abnormality occurs.

Map data is stored in the map storage unit 32.

The map data is formed of a plurality of maps which are layered and correspond to predetermined reduction scales. The map data includes road information which is information on roads, lane information which is information on lanes marking up each road, and marking line information which is information on marking lines marking up the lane.

The road information includes, for example, a shape of a road, a latitude and longitude of the road, a curvature of the road, a gradient of the road, an identifier of the road, the number of lanes of the road, the line type of the road, and information on an attribute of the road such as a general road, an expressway, and a priority road. The lane information includes, for example, identifiers of the lanes marking up the road, the latitudes and longitudes of the lanes, and information on the center line. The marking up line information includes identifiers of the lines marking up the lane, the latitudes and longitudes of the lines marking up the lane, and information on line types and curvatures of the lines marking up the lane. The road information is managed in units of road. The lane information and the marking line information are managed in units of lane. The map data is utilized for navigation, driving assistance, autonomous driving, and so on.

Traffic regulation information such as lane regulation, speed regulation, passage regulation, and tire chain regulation; toll-gate regulation information on regulations for interchanges and toll gates; traffic jam information; traffic accident information indicating the presence of a stopped vehicle and low-speed vehicle; obstacle information notifying, for example, falling objects or animals; a road abnormality information notifying, for example, a road damage or road surface abnormality; peripheral vehicle information; and so on may be received via the communication interface 14, and may be stored in the map storage unit 32 together with a time of reception and an identifier of a sender.

In FIG. 1, only one processor 11 is illustrated. However, the driving assistance device 10 may be provided with a plurality of processors that replace the processor 11. The plurality of processors share execution of a program that implements the functions of the recognition unit 21, abnormality detection unit 22, assistance determination unit 23, path generation unit 24, and mobile body control unit 25.

*Description of Operation*

An operation of the driving assistance device 10 according to Embodiment 1 will be described referring to FIGS. 2 to 9.

The operation of the driving assistance device 10 according to Embodiment 1 corresponds to a driving assistance method according to Embodiment 1. The operation of the driving assistance device 10 according to Embodiment 1 also corresponds to processing of a driving assistance program according to Embodiment 1.

The outline of the operation of the driving assistance device 10 according to Embodiment 1 will be described referring to FIGS. 2 to 5.

Figure 2:
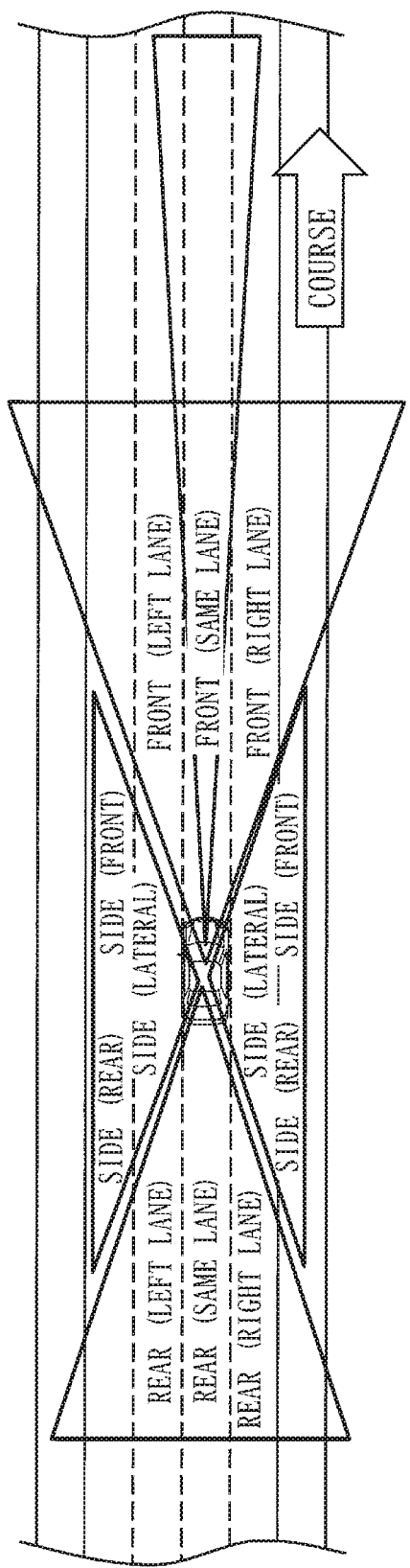
FIG. 2 is a diagram illustrating definitions of sensing areas according to Embodiment 2.

Definitions of sensing areas according to Embodiment 1 will be described referring to FIG. 2.

The space existing ahead of the front bumper portion of a vehicle which has a mobile body 100 as its center is defined as "front." The front area is separated into the same lane, a left lane, and a right lane in terms of a lane width as a criterion. The space existing behind the vehicle rear bumper portion is defined as the "rear." The rear area is separated into the same lane, a left lane, and a right lane in terms of the lane width as a criterion.

The spaces lateral to the side portions of the vehicle are defined as the "sides." Of the side areas, a portion overlapping the front (right lane) or front (left lane) is defined as side (front), and a portion overlapping the rear (right lane) or the rear (left lane) is defined as side (rear). The remaining side areas are defined as sides (lateral).

Each of the left lane, right lane, and the side areas need not be limited to an immediately adjacent lane but may include a lane spaced apart by two or more lanes. Although an example of a straight road is illustrated in FIG. 2, at a location such as a curve or an intersection, a corresponding area may be treated as curved in accordance with the road shape or the moving route to the destination.

The control patterns stored in the pattern storage unit 31 according to Embodiment 1 will be described referring to FIG. 3.

The control patterns are stored in the pattern storage unit 31 and are classified by sensing areas of the sensor in which the abnormality has occurred. Each control pattern is classified according to an assistance method, a moving place, and an assistance timing.

The assistance method refers to a method of assisting a peripheral body in which the sensor abnormality has occurred.

Here, the following three methods (1) to (3) are defined as the assistance method: (1) to substitutionally generate a moving path; (2) to provide sensing data of a sensing area of the sensor whose abnormality has been detected; and (3) to prevent another peripheral body from entering the sensing area of the sensor whose abnormality has been detected.

The moving place refers to a place to which the mobile body is to move to assist the autonomous driving of the peripheral body when a sensor of the peripheral body cannot monitor the (moving) place do so due to abnormality of the sensor of the peripheral body. The moving place may correspond to a sensing area that the sensor of the peripheral body is supposed to monitor in a normal state. Since another peripheral body may enter the sensing area and cause a collision while the sensor of the peripheral body is malfunctioning and therefore cannot monitor the sensing area, the mobile body 100 moves to the sensing area to monitor the sensing area using the sensor 41 mounted in the mobile body 100 when the abnormality has occurred in the peripheral body.

The assistance timing indicates a timing at which assistance is needed. For example, there is a case where an assistance is needed at all times and a case where an assistance is needed only when performing a specific behavior such as a right turn and a left turn.

As a specific example, in the case where the sensing area of the sensor whose abnormality has been detected is the front (same lane), substitutional generation of the moving path is stored as the assistance method, the same lane on the front is stored as the moving place, and at all times is stored as the assistance timing.

That is, in the case where the sensing area of the sensor where the abnormality has occurred is the front (same lane), the peripheral body where the sensor abnormality has occurred cannot detect the front, and accordingly to continue autonomous driving is difficult. Hence, the mobile body 100 moves ahead in the same lane at all times, generates the moving path of the peripheral body on behalf of the peripheral body, and notifies the peripheral body of the generated moving path, thereby assisting the peripheral body. Continuation of autonomous driving of the peripheral body is thus assisted.

Regarding until when to assist, the driver of the mobile body 100 may chose from: until reaching a road shoulder where the peripheral body can stop safely; until arriving at the destination of the peripheral body; and until reaching a repair shop such as a car dealer.

An operation example of the driving assistance device 10 according to Embodiment 1 will be described referring to FIG. 4.

FIG. 4 illustrates a case where an abnormality occurs in, among the sensors of a peripheral body 200, a sensor whose sensing area is the front (same lane).

In this case, the driving assistance device 10 controls the mobile body 100 to move in front of the peripheral body 200. The driving assistance device 10 particularly controls the mobile body 100 to move while keeping such a distance from the peripheral body 200 that another peripheral body 300 will not enter between the peripheral body 200 and the mobile body 100. Namely, the driving assistance device 10 controls the mobile body 100 to move within such a place that the mobile body 100 can sense the area the peripheral body 200 cannot sense and that another peripheral body 300 will not enter the area the peripheral body 200 cannot sense.

The driving assistance device 10 generates the moving path of the peripheral body 200. The driving assistance device 10 transmits to the peripheral body 200 the generated moving path and the sensing data obtained by sensing the area in front of the peripheral body 200.

When an abnormality occurs in the sensor whose sensing area is the front (same lane), it is difficult for the peripheral body 200 to continue autonomous driving. However, if the driving assistance device 10 assists the peripheral body 200 in this manner, the peripheral body 200 can continue autonomous driving.

Another operation example of the driving assistance device 10 according to Embodiment 1 will be described referring to FIG. 5.

Figure 5:
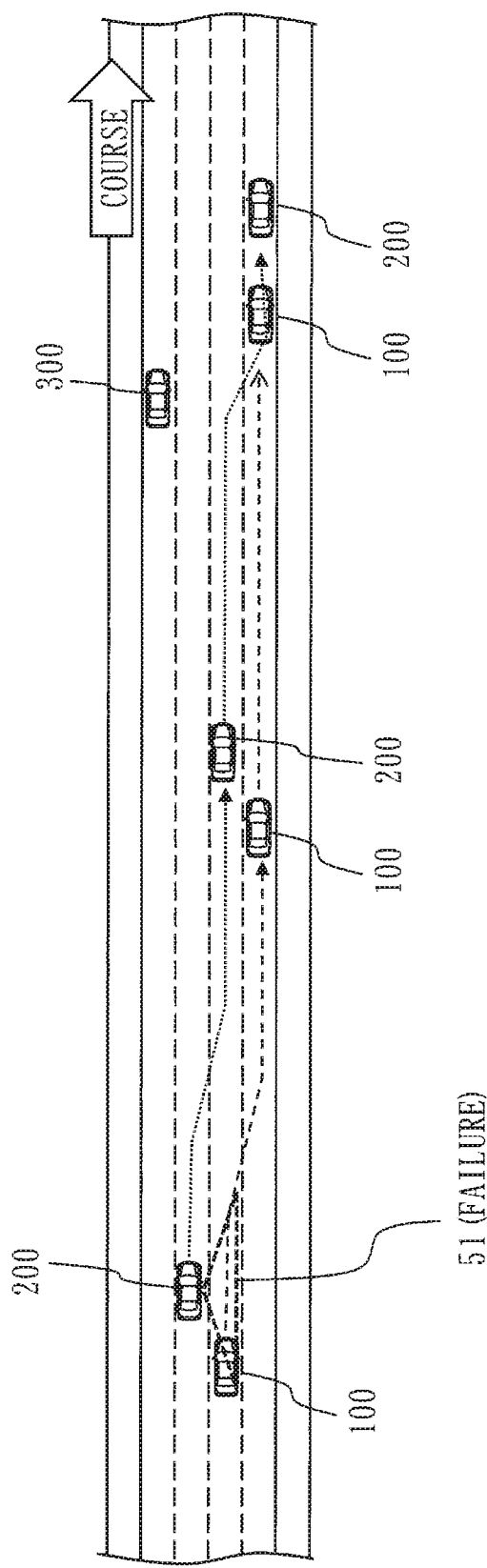
FIG. 5 is a diagram explaining another operation example of the driving assistance device 10 according to Embodiment 1.

FIG. 5 illustrates a case where an abnormality occurs in, among the sensors of the peripheral body 200, a sensor whose sensing area is the right side (lateral).

In this case, the driving assistance device 10 moves the mobile body 100 so as to move on the right side (rear) of the peripheral body 200. The driving assistance device 10 particularly controls the mobile body 100 to move while being located behind the peripheral body 200 at such a distance from the peripheral body 200 that another peripheral body 300 will not enter the right side (lateral) of the peripheral body 200. Namely, the driving assistance device 10 controls the mobile body 100 to move within such a place that the mobile body 100 can sense the area the peripheral body 200 cannot sense and that another peripheral body 300 will not enter the area the peripheral body 200 cannot sense.

The driving assistance device 10 transmits the sensing data obtained by sensing the right side (lateral) area of the peripheral body 200 to the peripheral body 200.

When an abnormality occurs in the sensor whose sensing area is the right side (lateral), the right-side adjacent lane cannot be sensed, so it is difficult for the peripheral body 200 to change the lane to the right. However, if the driving assistance device 10 assists the peripheral body 200 in this manner, the peripheral body 200 can change the lane to the right.

The operation of the driving assistance device 10 according to Embodiment 1 will be described in detail referring to FIGS. 6 to 9.

The overall operation of the driving assistance device 10 according to Embodiment 1 will be described referring to FIG. 6.

(Step S11: Sensing Process)

The recognition unit 21 acquires sensor data from the individual sensors 41 mounted in the mobile body 100 via the sensor interface 15. The recognition unit 21 detects an obstacle including a still or moving body existing on the periphery of the mobile body 100 and the peripheral body 200 moving on the periphery of the mobile body 100 from the acquired sensor data, and generates sensing data indicating the detected obstacle, as first data.

The sensing data indicates a relative distance and relative angle of the obstacle existing on the periphery of the mobile body 100, the type of the obstacle, the size of the obstacle, the moving direction of the obstacle (if the obstacle is moving), the type of the sensor that detects the obstacle, and detection accuracy. The type of the obstacle is, for example, a 4-wheel vehicle, a 2-wheel vehicle, a pedestrian, or a utility pole.

(Step S12: Data Reception Process)

The recognition unit 21 receives sensing data from the peripheral body 200 moving on the periphery of the mobile body 100, as second data via the communication interface 14. That is, the recognition unit 21 receives the second data indicating the obstacle detected by the peripheral body 200.

(Step S13: Data Transmission Process)

The recognition unit 21 transmits the first data generated in step S11 to the peripheral body 200 via the communication interface 14.

(Step S14: Data Integration Process)

The recognition unit 21 converts the first data acquired in step S11 and the second data received in step S12 to data which use the same coordinate system. The recognition unit 21 may convert the first data and the second data each to a coordinate system whose origin is the position of the peripheral body 200, or into a coordinate system whose origin is a specific reference point.

The recognition unit 21 transmits the converted first data and second data to the abnormality detection unit 22 and path generation unit 24.

(Step S15: Abnormality Detection Process)

The abnormality detection unit 22 compares the first data and with the second data which are transmitted in step S14, to specify an area that is not detected by the sensor 41 mounted in the mobile body 100 and an area that is not detected by a sensor mounted in the peripheral body 200. The abnormality detection unit 22 thus detects an abnormality in the sensor 41 mounted in the mobile body 100 and an abnormality in a sensor 51 mounted in the peripheral body 200 moving on the periphery of the mobile body 100.

If the abnormality is detected about the sensor 41, the abnormality detection unit 22 transmits range data indicating the sensing area of the sensor 41 whose abnormality has been detected, to the peripheral body 200 via the communication interface 14. If an abnormality is detected about the sensor 51, the abnormality detection unit 22 transmits range data indicating the sensing area of the sensor 51 whose abnormality has been detected, to the assistance determination unit 23.

(Step S16: Assistance Determination Process)

If the abnormality is detected about the sensor 51 in step S15, the assistance determination unit 23 reads a control pattern corresponding to the transmitted sensing area of the sensor 51 from the pattern storage unit 31. The assistance determination unit 23 transmits the readout control data to the path generation unit 24.

(Step S17: Path Generation Process)

If the control pattern is not transmitted in step S16, the path generation unit 24 generates path data indicating the moving path of the mobile body 100 based on the sensing data transmitted in step S14 and the map data stored in the map storage unit 32. That is, the path generation unit 24 generates the path data indicating a moving path which is needed by the mobile body 100 to arrive at the destination. The moving path is, for example, a moving path along which the mobile body 100 moves while keeping the lane, a moving path along which the mobile body 100 moves by changing the lane, or a moving path along which the mobile body 100 moves to follow another car.

If the control pattern is transmitted in step S16, the path generation unit 24 generates path data indicating a moving path of the mobile body 100 along the control pattern. That is, the path generation unit 24 generates the path data indicating the moving path of the mobile body 100 to correspond to the sensing area of the sensor 41 whose abnormality has been detected. In this generation, the path generation unit 24 generates the path data by considering both the sensing data transmitted in step S14 and the map data stored in the map storage unit 32.

Depending on the control pattern, the path generation unit 24 generates guidance data indicating the moving path of the peripheral body 200. The path generation unit 24 transmits the generated guidance data to the peripheral body 200 via the communication interface 14.

(Step S18: Mobile Body Control Process)

The mobile body control unit 25 controls equipment such as a steering wheel, an accelerator, and a brake which are mounted in the mobile body 100, via the sensor interface 15 based on the path data generated in step S17.

Furthermore, the mobile body control unit 25 displays the path data generated in step S17 onto the display device 42 via the display interface 16.

The abnormality detection process (step S15 of FIG. 6) according to Embodiment 1 will be described referring to FIG. 7.

(Step S21: Data Reception Process)

The abnormality detection unit 22 receives the first data and second data transmitted in step S14.

(Step S22: Second Data Determination Process)

The abnormality detection unit 22 determines whether the second data is received or not in step S21.

If the second data is received, the abnormality detection unit 22 advances the processing to step S23. If the second data is not received, the abnormality detection unit 22 returns the processing to step S21.

In cases where there is no peripheral body 200 on the periphery of the mobile body 100, the second data is not received in step S12. In this case, the second data is not received in step S21. If the second data is not received, the processing of step S23 and beyond cannot be executed. Thus, if the second data is not received, the processing is returned to step S21, and first data and second data are received anew.

(Step S23: Data Comparison Process)

The abnormality detection unit 22 compares the obstacle indicated by the first data and the obstacle indicated by the second data, and specifies any obstacle indicated only by the first data and an obstacle indicated only by the second data.

(Step S24: Abnormality Determination Process)

The abnormality detection unit 22 determines, from the positional relationship between the mobile body 100 and the peripheral body 200, whether or not there is an obstacle indicated only by the second data despite that the obstacle is located in the sensing area of the mobile body 100. The abnormality detection unit 22 also determines, from the positional relationship between the mobile body 100 and the peripheral body 200, whether or not there is an obstacle indicated only by the first data despite that the obstacle is located in the sensing area of the peripheral body 200.

If either case applies, this indicates that an abnormality is detected, so the abnormality detection unit 22 advances the processing to step S25. If neither case applies, this indicates that an abnormality is not detected, so the abnormality detection unit 22 returns the processing to step S21.

(Step S25: Sensor Determination Process)

If an obstacle is indicated only by the second data despite that the obstacle is located in the sensing area of the mobile body 100, the abnormality detection unit 22 concludes this as an abnormality of the sensor 41 of the mobile body 100, and advances the processing to step S26. On the other hand, if there is an obstacle indicated only by the first data despite that the obstacle is located in the sensing area of the peripheral body 200, the abnormality detection unit 22 concludes this as an abnormality of the sensor 51 of the peripheral body 200, and advances the processing to step S27.

(Step S26: First Abnormality Notification Process)

The abnormality detection unit 22 specifies an area where there is an obstacle indicated only by the second data despite that this area is within the sensing area of the mobile body 100, as the sensing area of the sensor 41 whose abnormality has been detected. The abnormality detection unit 22 transmits range data indicating the fact that an abnormality in the sensor 41 is detected and indicating the specified sensing area, to the peripheral body 200 via the communication interface 14.

(Step S27: Second Abnormality Notification Process)

The abnormality detection unit 22 specifies an area where there is an obstacle indicated only by the first data despite that this area is within the sensing area of the peripheral body 200, as the sensing area of the sensor 51 whose abnormality has been detected. The abnormality detection unit 22 transmits range data indicating the fact that an abnormality in the sensor 51 is detected and indicating the specified sensing area, to the peripheral body 200 via the communication interface 14. The abnormality detection unit 22 also transmits the range data to the assistance determination unit 23.

After the process of step S26 or step S27, the abnormality detection unit 22 returns the processing to step S21 and stands by until new first data and second data are transmitted.

There are cases where no obstacles are temporarily detected due to some reason. If a state where no obstacles are detected from the same area continues for a predetermined period of time, the abnormality detection unit 22 may conclude that an abnormality occurs in either the sensor 41 or 51. The abnormality detection unit 22 may determine whether or not an abnormality occurs in either the sensor 41 or 51 by also considering the sensor type included in the first data and second data.

Figure 8:
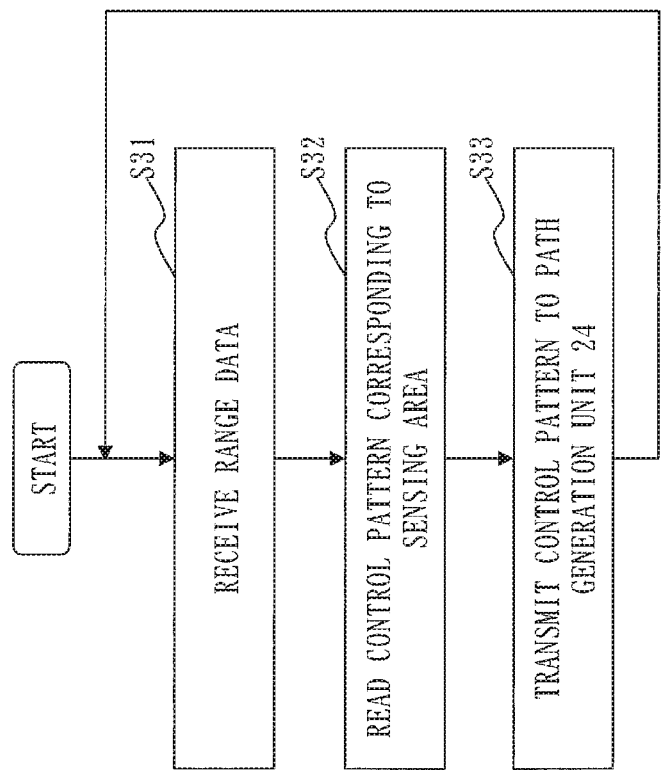
FIG. 8 is a flowchart of an assistance determination process according to Embodiment 1.

The assistance determination process (step S16 of FIG. 6) according to Embodiment 1 will be described referring to FIG. 8.

(Step S31: Range Data Reception Process)

The assistance determination unit 23 receives the range data transmitted in step S27.

(Step S32: Control Pattern Readout Process)

The assistance determination unit 23 reads a control pattern corresponding to the sensing area indicated by the range data received in step S31, from the pattern storage unit 31. That is, the assistance determination unit 23 reads a control pattern corresponding to the sensing area of the sensor 51 of the peripheral body 200 whose abnormality has been detected, from the pattern storage unit 31.

(Step S33: Control Pattern Transmission Process)

The assistance determination unit 23 transmits the control pattern read in step S32 to the path generation unit 24.

If a control pattern corresponding to the sensing area cannot be read in step S32, that is, if a control pattern corresponding to the sensing area is not stored in the pattern storage unit 31, the assistance determination unit 23 transmits data indicating absence of a control pattern and indicating the sensing area of the sensor 51 of the peripheral body 200 whose abnormality has been detected, to the path generation unit 24.

After the process of step S33, the assistance determination unit 23 returns the processing to step S31 and stands by until new range data is transmitted.

The path generation process (step S17 of FIG. 6) according to Embodiment 1 will be described referring to FIG. 9.

(Step S41: Data Reception Process)

The path generation unit 24 receives the first data and second data transmitted in step S14.

(Step S42: Mobile Body Data Acquisition Process)

The path generation unit 24 acquires mobile body data such as the position (latitude, longitude, altitude), speed, acceleration, traveling direction, steering angle, movement history, and predicted movement of the mobile body 100, and a position information detection method, from the sensors 41 mounted in the mobile body 100 via the sensor interface 15.

(Step S43: Map Data Readout Process)

The path generation unit 24 reads map data of the periphery of the position of the mobile body 100 acquired in step S42, from the map storage unit 32.

(Step S44: Control Pattern Determination Process)

The path generation unit 24 determines whether or not data indicating a control pattern or absence of a control pattern has been transmitted in step S33.

If data indicating a control pattern or absence of a control pattern has been transmitted, the path generation unit 24 receives the data indicating a control pattern or absence of the control pattern, and then advances the processing to step S45. On the other hand, if data indicating a control pattern or absence of a control pattern has not been transmitted, the path generation unit 24 advances the processing to step S46.

(Step S45: First Path Generation Process)

If a control pattern is received in step S44, the path generation unit 24 generates path data indicating the moving path of the mobile body 100 in accordance with the control pattern. That is, the path generation unit 24 generates path data indicating the movement within such a place that another peripheral body is interfered with from entering the sensing area and that the sensor 41 mounted in the mobile body 100 can sense the sensing area of the sensor in which the abnormality has occurred.

In this data generation, the path generation unit 24 generates the path data by considering the first and second data received in step S41, the mobile body data acquired in step S42, and the map data read out in step S43. For example, when moving to the front (same lane) of the peripheral body 200, the path generation unit 24 generates path data by considering the position of the obstacle indicated by the first data or second data.

If data indicating absence of a control pattern is received in step S44, the path generation unit 24 generates path data of the movement within the central portion of the sensing area of the sensor 51 of the peripheral body 200 whose abnormality has been detected.

Depending on the control pattern, the path generation unit 24 generates guidance data indicating the moving path of the peripheral body 200.

In the case of the control patterns illustrated in FIG. 3, when an abnormality occurs in, among the sensors 51 of the peripheral body 200, a sensor 51 whose sensing area is the front (same lane), the path generation unit 24 generates guidance data. In this case, the path generation unit 24 generates guidance data indicating a moving path of the movement behind the mobile body 100.

(Step S46: Second Path Generation Process)

The path generation unit 24 generates path data by considering the first data and second data received in step S41, the mobile body data acquired in step S42, and the map data read out in step S43.

(Step S47: Path Transmission Process)

The path generation unit 24 transmits the path data generated in step S45 or step S46 to the mobile body control unit 25. When guidance data is generated in step S45, the path generation unit 24 transmits the guidance data to the peripheral body 200 via the communication interface 14.

Assume that the assistance method indicated by the control pattern read out in step S43 signifies substitutional sensing. When the assistance timing indicated by the control pattern has come, the recognition unit 21 transmits the first data of the target area to the peripheral body 200 frequently. When the assistance timing has come, it can be specified by receiving a notification from the peripheral body 200.

Effect of Embodiment 1

As described above, the driving assistance device 10 according to Embodiment 1 determines the moving place of the mobile body 100 to correspond to the sensing area of the sensor 51 of the peripheral body 200 whose abnormality has been detected. The driving assistance device 10 then generates the path data indicating the moving path of the mobile body 100 such that the mobile body 100 moves within the moving place.

Thus, it is possible to perform control such as detecting an area that is a blind spot of the peripheral body 200 due to an abnormality of the sensor 51 on behalf of the peripheral body 200, and preventing another peripheral body 300 from entering the area that is a blind spot.

The driving assistance device 10 according to Embodiment 1 determines the assistance method and assistance timing to correspond to the sensing area of the sensor 51 of the peripheral body 200 whose abnormality has been detected. Therefore, it is possible to assist the peripheral body 200 by an appropriate method at an appropriate timing. As a result, the peripheral body 200 in which an abnormality has occurred in the sensor 51 can continue autonomous driving.

\*\*\*Other Configurations\*\*\*

<Modification 1>

FIGS. 4 and 5 illustrate an example in which one mobile body 100 assists the peripheral body 200. However, in cases where an abnormality occurs in a plurality of sensors 51 and sensing of a plurality of sensing areas cannot be performed, the mobile body 100 may assist the peripheral body 200 by cooperating with another peripheral body 300.

When the mobile body 100 assists the peripheral body 200 by cooperating with another peripheral body 300, the mobile body 100 and peripheral body 300 may adjust the places within which they move, or the peripheral body 200 may output instructions on the moving places to the mobile body 100 and another peripheral body 300. Alternatively, either one of the mobile body 100 and another peripheral body 300 may output an instruction on the moving place to the other one.

For example, as indicated in FIG. 10, the number of vehicles necessary for assistance is determined for the sake of a sensing area of a sensor in which an abnormality has occurred. FIG. 10 indicates the number of vehicles needed for assistance in accordance with an angle within which sensing cannot be performed, or in accordance with the number of lanes. For example, if detection cannot be performed for a range of 90° to 180°, three or more vehicles are needed for assistance.

<Modification 2>

In Embodiment 1, the moving place of the mobile body 100 and so on are determined to correspond to the sensing area of the sensor 51 whose abnormality has been detected. Alternatively, the moving place of the mobile body 100 and so on may be determined by considering not only the correspondence with the sensing area of the sensor 51 but also the type of the sensor 51. The type of the sensor 51 signifies classification of the sensor such as a millimeter-wave radar, a monocular camera, a stereo camera, LiDAR, and a sonar.

For example, as indicated in FIG. 11, control patterns may be stored in the pattern storage unit 31 classified by the type of the sensor 51 whose abnormality has been detected and in units of the direction of sensing area. In step S16 of FIG. 6, the assistance determination unit 23 may read the control pattern to correspond to the type of the sensor 51 whose abnormality has been detected and classified by the direction of the sensing area.

<Modification 3>

Embodiment 1 describes that the driving assistance device 10 mounted in the mobile body 100 generates the guidance data indicating the guidance path of the peripheral body 200.

There are cases where the guidance data indicating the guidance path of the mobile body 100 is generated by the peripheral body 200. In the example illustrated in FIG. 3, when an abnormality occurs in the sensor 41 of the mobile body 100 whose sensing area is the front (same lane), the guidance data is generated by the peripheral body 200.

An operation of the driving assistance device 10 will be described referring to FIG. 12, by considering a case where the guidance data is generated by the peripheral body 200.

Suppose that the guidance data is included in the second data and transmitted by the peripheral body 200.

Figure 9:
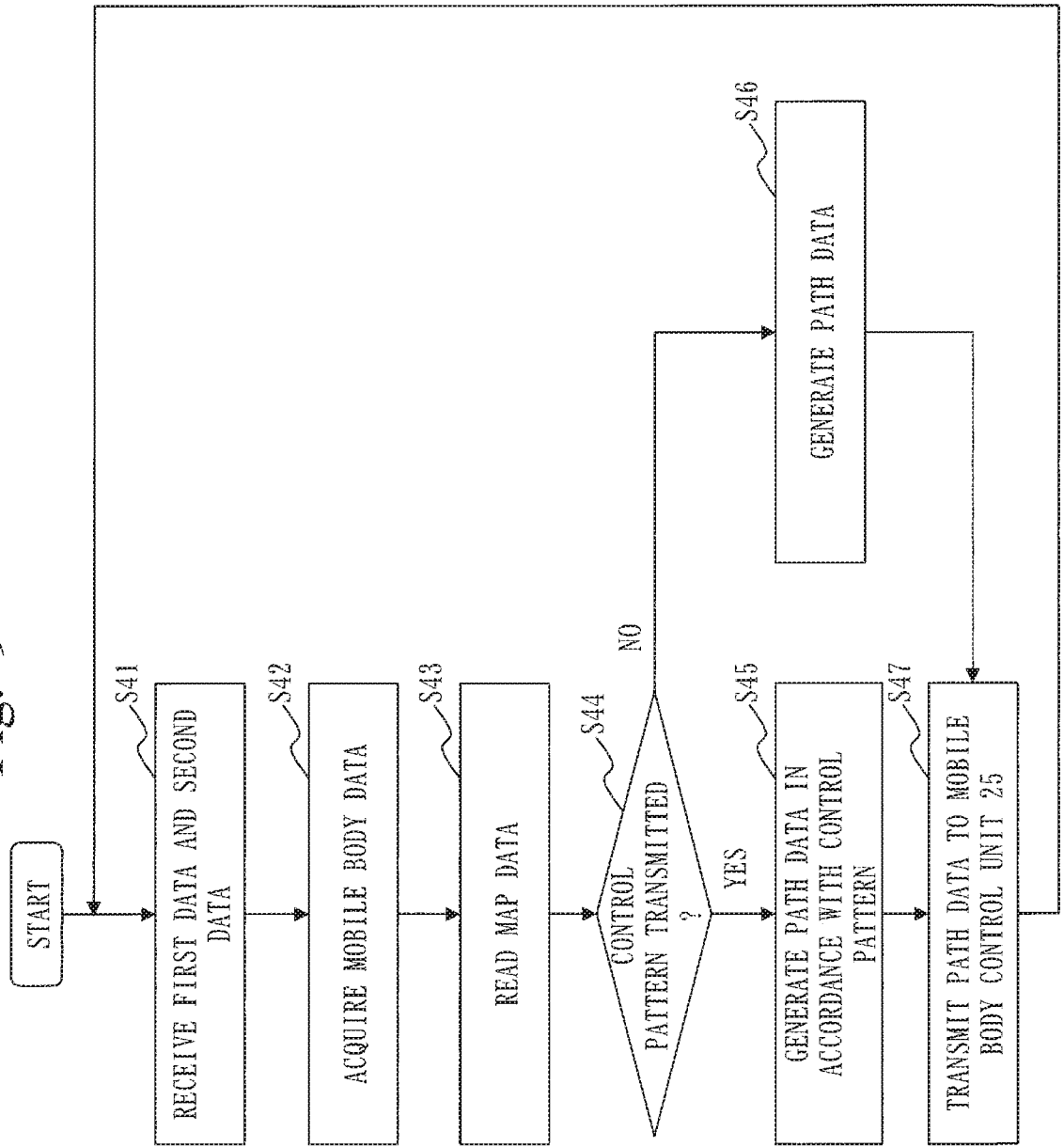
FIG. 9 is a flowchart of a path generation process according to Embodiment 1.

The processes of step S51 to step S53 are the same as the processes of step S41 to step S43 of FIG. 9. The processes of step S55 to step S57 are the same as the processes of step S44 to step S46 of FIG. 9.

(Step S54: Guidance Data Determination Process)

The path generation unit 24 determines whether or not the guidance data is included in the second data received in step S51.

If the guidance data is included, the path generation unit 24 advances the processing to step S58. If the guidance data is not included, the path generation unit 24 advances the processing to step S55.

(Step S58: Acceptance Determination Process)

The path generation unit 24 determines whether or not to follow the guidance data.

Figure 7:
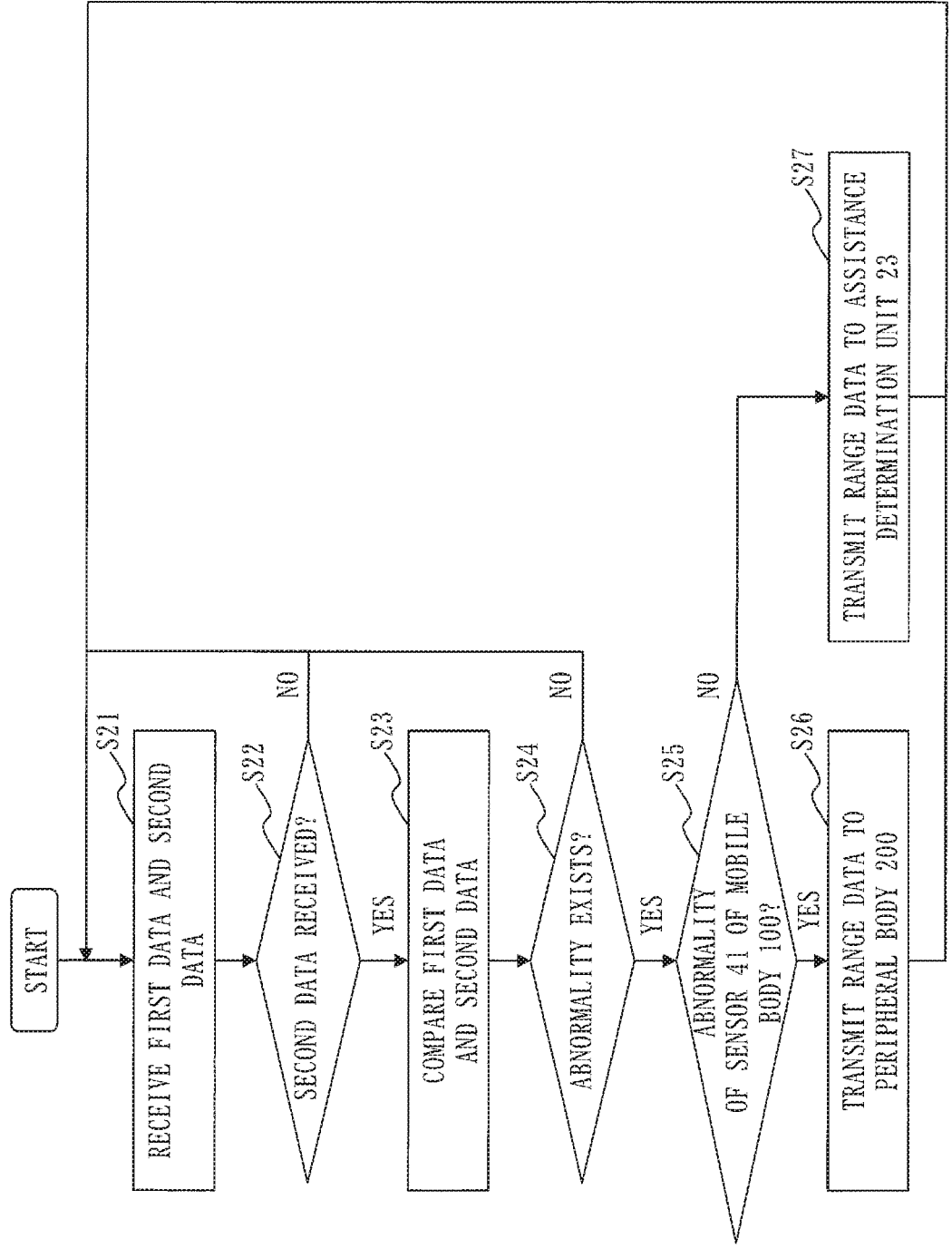
FIG. 7 is a flowchart of an abnormality detection process according to Embodiment 1.

In a specific example, if an abnormality is detected in the sensor 41 mounted in the mobile body 100, then in step S26 of FIG. 7, the abnormality detection unit 22 transmits the range data to the path generation unit 24 as well. The path generation unit 24 determines whether guidance by the peripheral body 200 is needed or not based on the range data transmitted from the abnormality detection unit 22. For example, the path generation unit 24 reads the control pattern corresponding to the sensing area of the sensor 41 whose abnormality has been detected, from the pattern storage unit 31. If the assistance method included in the readout control pattern indicates substitutional generation of the moving path, the path generation unit 24 determines that guidance by the peripheral body 200 is necessary.

If it is determined that guidance is necessary, the path generation unit 24 determines that the guidance data will be followed. If it is determined that guidance is not necessary, the path generation unit 24 determines that the guidance data will not be followed.

If it is determined that the guidance data will be followed, the path generation unit 24 advances the processing to step S59. If it is determined that the guidance data will not be followed, the path generation unit 24 advances the processing to step S55.

(Step S59: Path Transmission Process)

The path generation unit 24 transmits the path data generated in step S56 or step S57 to the mobile body control unit 25 in the same manner as in step S47 of FIG. 9. When the guidance data is generated in step S56, the path generation unit 24 transmits the guidance data to the peripheral body 200 via the communication interface 14.

If it is determined in step S58 that the guidance data will be followed, the path generation unit 24 transmits the guidance data to the mobile body control unit 25 as the path data.

<Modification 4>

In Embodiment 1, assistance to the peripheral body 200 is performed when the abnormality detection unit 22 detects an abnormality in the sensor 51. Assistance to the peripheral body 200 may be performed also when range data indicating occurrence of an abnormality in the sensor 51 is transmitted from the peripheral body 200.

Figure 6:
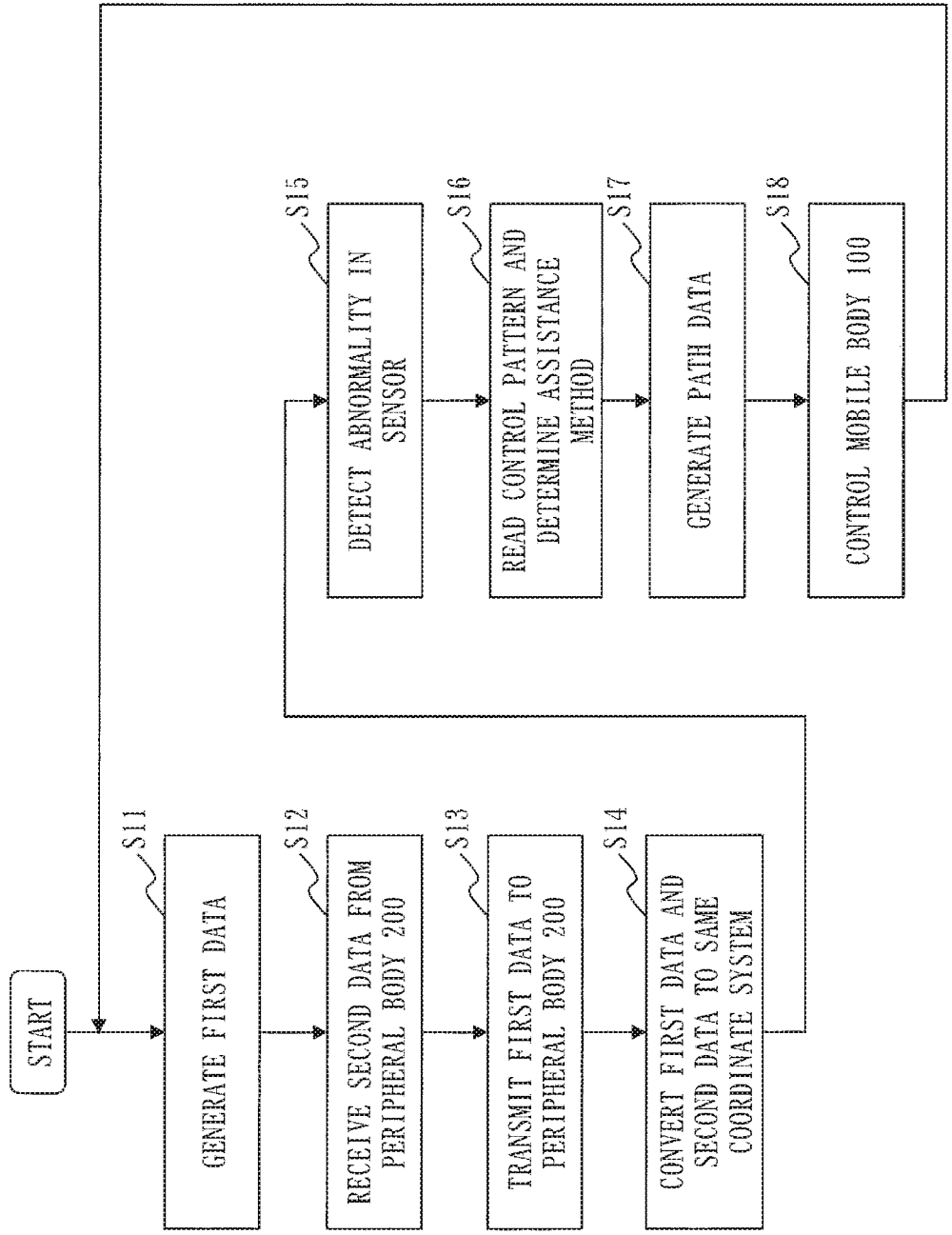
FIG. 6 is a flowchart of an overall operation of the driving assistance device 10 according to Embodiment 1.

In this case, in step S12 of FIG. 6, the recognition unit 21 receives range data from the peripheral body 200. When the range data is received, then in step S16 of FIG. 6, the assistance determination unit 23 reads, from the pattern storage unit 31, a control pattern corresponding to the sensing area indicated by the range data which is received from the peripheral body 200.

<Modification 5>

In Embodiment 1, the assistance to peripheral body 200 is performed when an abnormality in the sensor 51 of the peripheral body 200 is detected. Even when an abnormality in the sensor 51 of the peripheral body 200 is not detected, the driving assistance device 10 may assist the peripheral body 200 if there is an area that forms a blind spot of the peripheral body 200 due to the road shape or the like. In this case, the driving assistance device 10 may treat the area that forms the blind spot as the sensing area of the sensor 51 whose abnormality has been detected.

<Modification 6>

In Embodiment 1, the driving assistance device 10 is provided with the mobile body control unit 25 as a functional constituent element. However, the driving assistance device 10 need not be provided with a mobile body control unit 25 necessarily, as illustrated in FIG. 13. In this case, a mobile body control unit 25 is provided to a device that is different from the driving assistance device 10, and the path generation unit 24 transmits route data to the mobile body control unit 25 provided to the different device via the communication interface 14.

In Embodiment 1, the map data is stored in the storage 13 of the driving assistance device 10. However, the driving assistance device 10 may acquire the map data from an external device via the communication interface 14, as illustrated in FIG. 13.

<Modification 7>

In Embodiment 1, the functions of the recognition unit 21, abnormality detection unit 22, assistance determination unit 23, path generation unit 24, and mobile body control unit 25 are implemented by software. As Modification 7, the functions of the recognition unit 21, abnormality detection unit 22, assistance determination unit 23, path generation unit 24, and mobile body control unit 25 may be implemented by hardware. Modification 7 will now be described regarding its differences from Embodiment 1.

Figure 14:
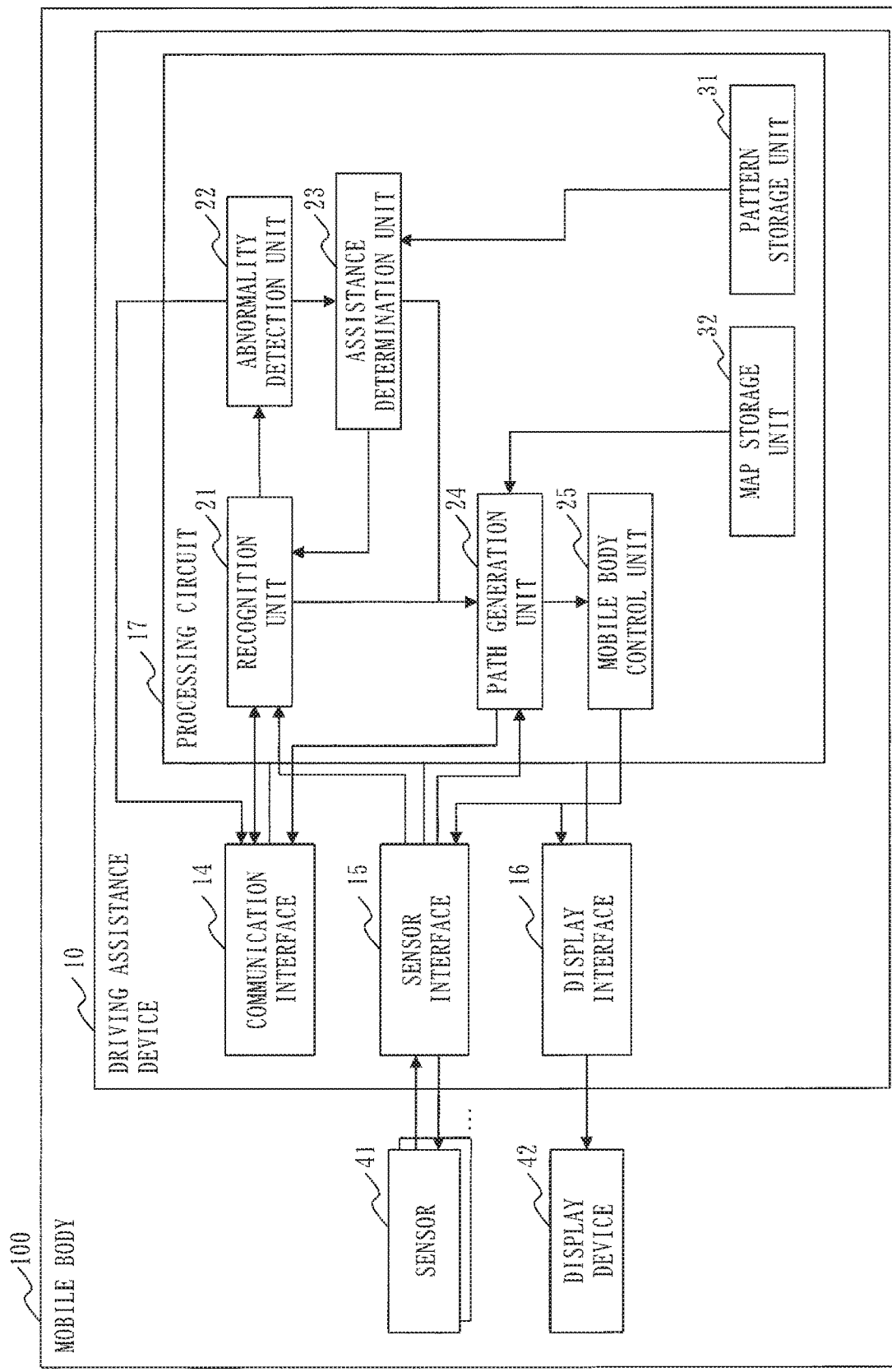
FIG. 14 is a configuration diagram of the driving assistance device 10 according to Modification 7.

A configuration of the driving assistance device 10 according to Modification 7 will be described referring to FIG. 14.

In cases where the functions of the recognition unit 21, abnormality detection unit 22, assistance determination unit 23, path generation unit 24, and mobile body control unit 25 are implemented by hardware, the driving assistance device 10 is provided with a processing circuit 17 instead of a processor 11, a memory 12, and a storage 13. The processing circuit 17 is an exclusive electronic circuit that implements the functions of the recognition unit 21, abnormality detection unit 22, assistance determination unit 23, path generation unit 24, and mobile body control unit 25, and the functions of the memory 12 and storage 13.

Assumed examples of the processing circuit 17 are a single circuit, a composite circuit, a programmed processor, a parallel-programmed processor, a logic IC, a gate array (GA), an application specific integrated circuit (ASIC), and a field-programmable gate array (FPGA).

The functions of the recognition unit 21, abnormality detection unit 22, assistance determination unit 23, path generation unit 24, and mobile body control unit 25 may be implemented by one processing circuit 17. Alternatively, the functions of the recognition unit 21, abnormality detection unit 22, assistance determination unit 23, path generation unit 24, and mobile body control unit 25 may be implemented by a plurality of processing circuits 17 in a dispersed manner.

<Modification 8>

As Modification 8, some functions may be realized by hardware, and the other functions may be implemented by software. That is, of the functions of the recognition unit 21, abnormality detection unit 22, assistance determination unit 23, path generation unit 24, and mobile body control unit 25, some functions may be implemented by hardware, and the other functions may be implemented by software.

The processor 11, the memory 12, the storage 13, and the processing circuit 17 will be collectively referred to as "processing circuitry". That is, the functions of the individual functional constituent elements are implemented by the processing circuitry.

Embodiment 2

Embodiment 2 is different from Embodiment 1 in that the range of assistance to the peripheral body 200 is determined. In Embodiment 2, this difference will be described, and a description on identical matters will be omitted.

*Description of Configuration*

Figure 15:
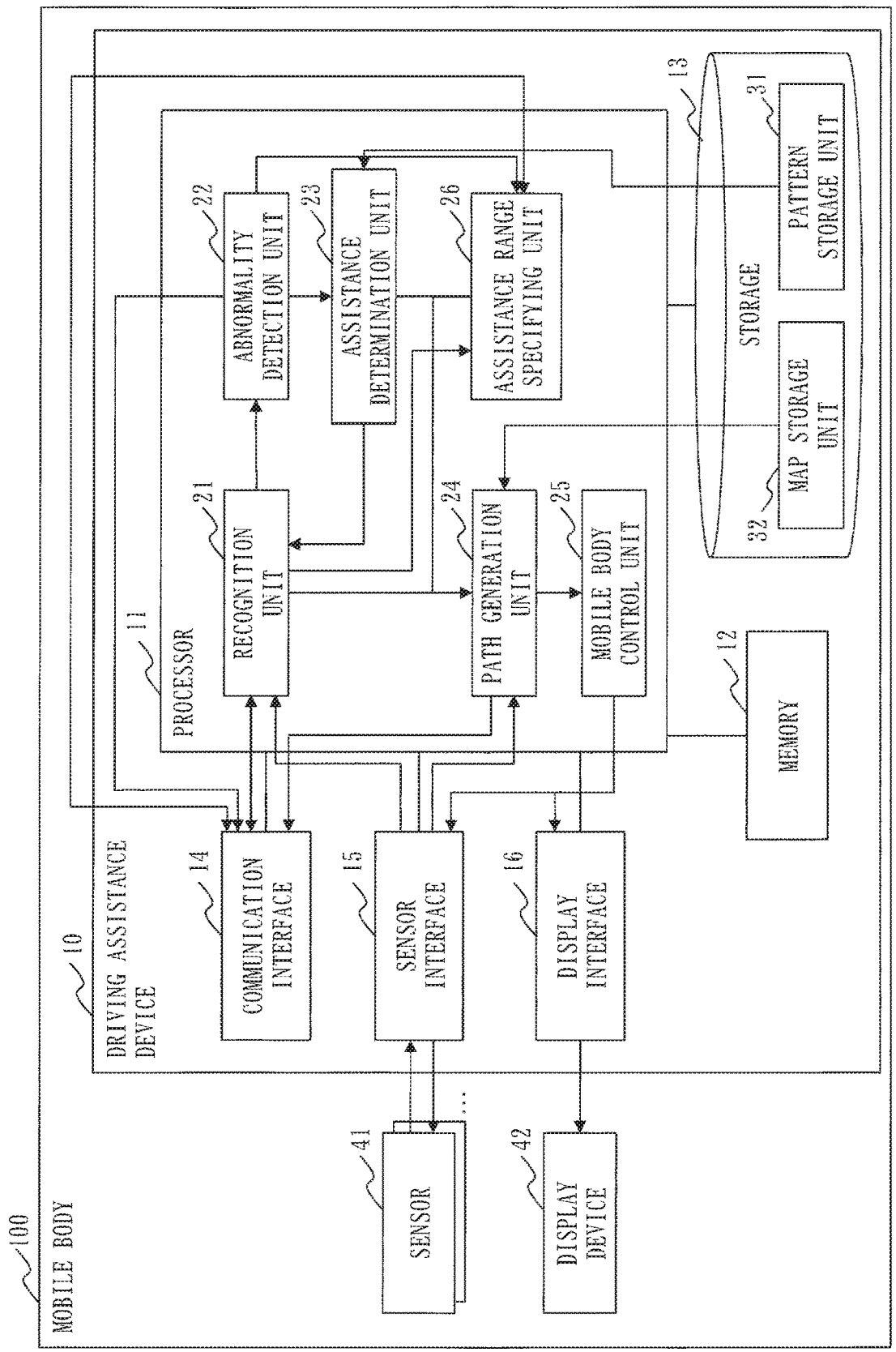
FIG. 15 is a configuration diagram of a driving assistance device 10 according to Embodiment 2.

A configuration of a driving assistance device 10 according to Embodiment 2 will be described referring to FIG. 15.

The driving assistance device 10 is provided with an assistance range specifying unit 26 as a functional constituent element. This is a difference from the driving assistance device 10 illustrated in FIG. 1. The assistance range specifying unit 26 is implemented by software, just like the other functional constituent elements are. The assistance range specifying unit 26 may be implemented by hardware.

*Description of Operation*

Figure 16:
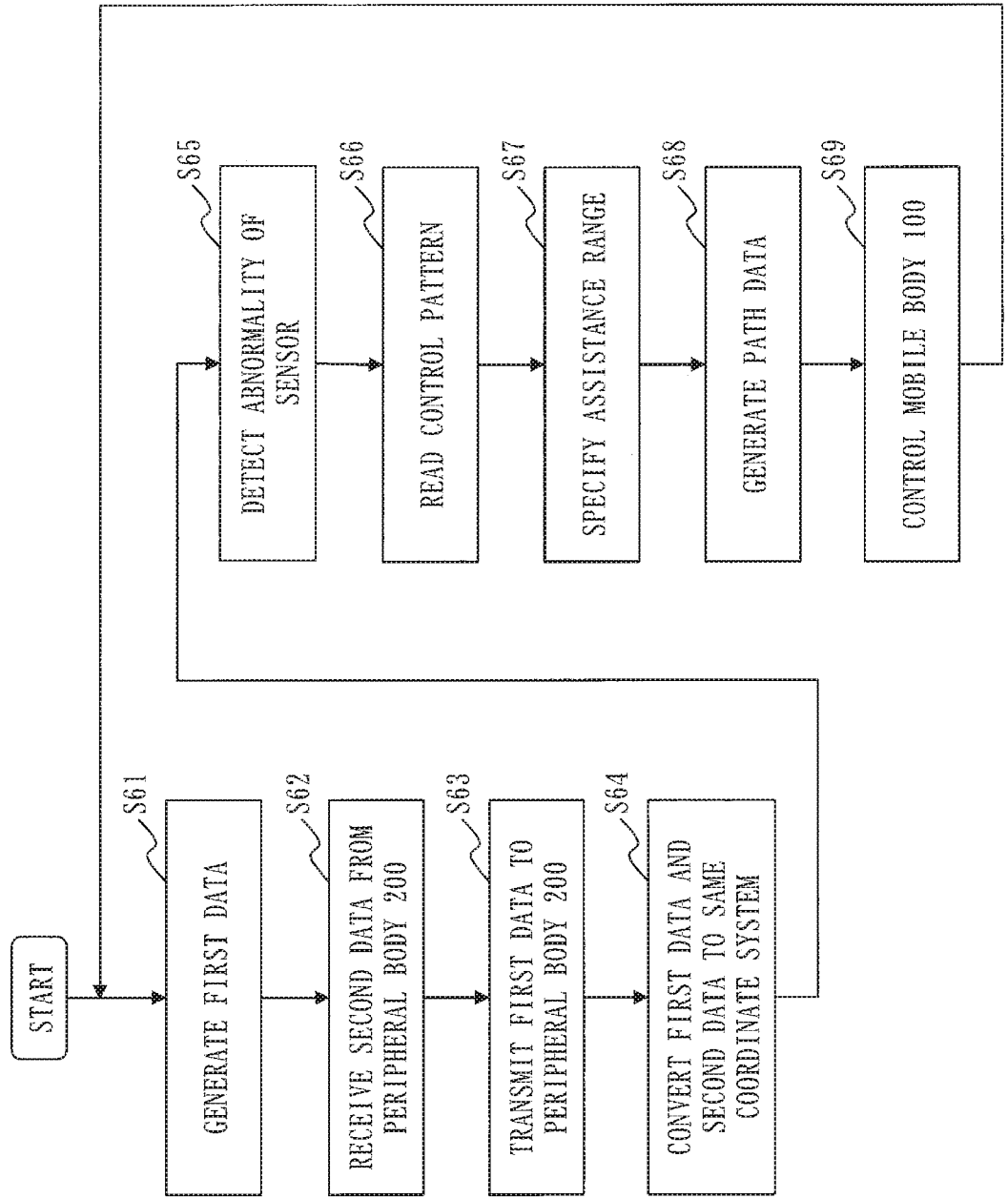
FIG. 16 is a flowchart of an overall operation of the driving assistance device 10 according to Embodiment 2.

An operation of the driving assistance device 10 according to Embodiment 2 will be described referring to FIGS. 16 to 18.

The operation of the driving assistance device 10 according to Embodiment 2 corresponds to a driving assistance method according to Embodiment 2. The operation of the driving assistance device 10 according to Embodiment 2 also corresponds to processing of a driving assistance program according to Embodiment 2.

An overall operation of the driving assistance device 10 according to Embodiment 2 will be described referring to FIG. 16.

The processes of step S61 to step S66 are the same as the processes of step S11 to step S16 of FIG. 6. The process of step S69 is the same as the process of step S18 of FIG. 6. Note that in step S62, second route data indicating a planned moving route of the peripheral body 200 to the destination is received as being included in second data.

The planned moving route to the destination describes time-base information of a lane that should be traveled for arriving at the destination, a recommended lane-change section and a direction of lane change if lane change is needed, a speed pattern required to realize a safe movement to the destination based on the traffic regulation, and so on.

(Step S67: Assistance Range Specifying Process)

When an abnormality in a sensor 51 of a peripheral body 200 is detected in step S65, the assistance range specifying unit 26 acquires first route data indicating a planned moving route of the mobile body 100 to the destination, from an external device such as a navigation device via a communication interface 14. The assistance range specifying unit 26 then specifies a range of assistance to the peripheral body 200 based on the planned moving route, indicated by the first route data, of the mobile body 100 to the destination, and a planned moving route, indicated by the second route data, of the peripheral body 200 to the destination.

(Step S68: Path Generation Process)

If a control pattern is not transmitted in step S66, a path generation unit 24 generates path data as in Embodiment 1.

If a control pattern is transmitted in step S66, the path generation unit 24 generates path data that matches the control pattern concerning the range of assistance to the peripheral body 200 which is specified in step S67. As for the remaining planned moving route, the path generation unit 24 generates path data without regard to the control pattern, as in a case in step S66 where the control pattern is not generated.

The assistance range specifying process (step S67 of FIG. 16) according to Embodiment 2 will be described referring to FIG. 17.

(Step S71: First Route Data Acquisition Process)

The assistance range specifying unit 26 acquires the first route data from the external device via the communication interface 14.

(Step S72: Second Route Data Acquisition Process)

The assistance range specifying unit 26 acquires the second route data from the recognition 21.

(Step S73: Route Determination Process)

The assistance range specifying unit 26 determines whether or not the route indicated by the first route data and the route indicated by the second route data coincide, starting with the current point as far as a destination at a reference distance. The reference distance is a distance determined in advance and is, for example, 500 m.

If it is determined that the two routes coincide, the assistance range specifying unit 26 advances the processing to step S74. If it is determined that the two routes do not coincide, the assistance range specifying unit 26 advances the processing to step S75.

(Step S74: Assistance Notification Process)

The assistance range specifying unit 26 notifies the path generation unit 24 that assistance will be performed, starting with the current point as far as the destination at the reference distance.

(Step S75: Request Transmission Process)

The assistance range specifying unit 26 transmits request data, requesting assistance for the peripheral body 200, to another peripheral body 300 via the communication interface 14.

(Step S76: Request Determination Process)

The assistance range specifying unit 26 determines whether or not acceptance data indicating acceptance of the request for assistance is received from another peripheral body 300.

If acceptance data is received, the assistance range specifying unit 26 advances the processing to step S77. If acceptance data is not received, the assistance range specifying unit 26 advances the processing to step S78.

(Step S77: Takeover Notification Process)

Via the communication interface 14, the assistance range specifying unit 26 transmits takeover data, requesting takeover of the assistance, to a mobile body that is the sender of the acceptance data received in step S76. The assistance range specifying unit 26 also notifies the path generation unit 24 and the peripheral body 200 that another peripheral body 300 will take over the assistance.

(Step S78: Termination Notification Process)

Via the communication interface 14, the assistance range specifying unit 26 notifies the path generation unit 24 and the peripheral body 200 that the assistance will be terminated.

The path generation process (step S68 of FIG. 16) according to Embodiment 2 will be described referring to FIG. 18.

The processes of step S81 to step S84 are the same as the processes of step S41 to step S44 of FIG. 9. The processes of step S86 to step S87 are the same as the processes of step S45 to step S46 of FIG. 9. The process of step S90 is the same as the process of step S47 of FIG. 9.

(Step S85: Notification Determination Process)

Figure 17:
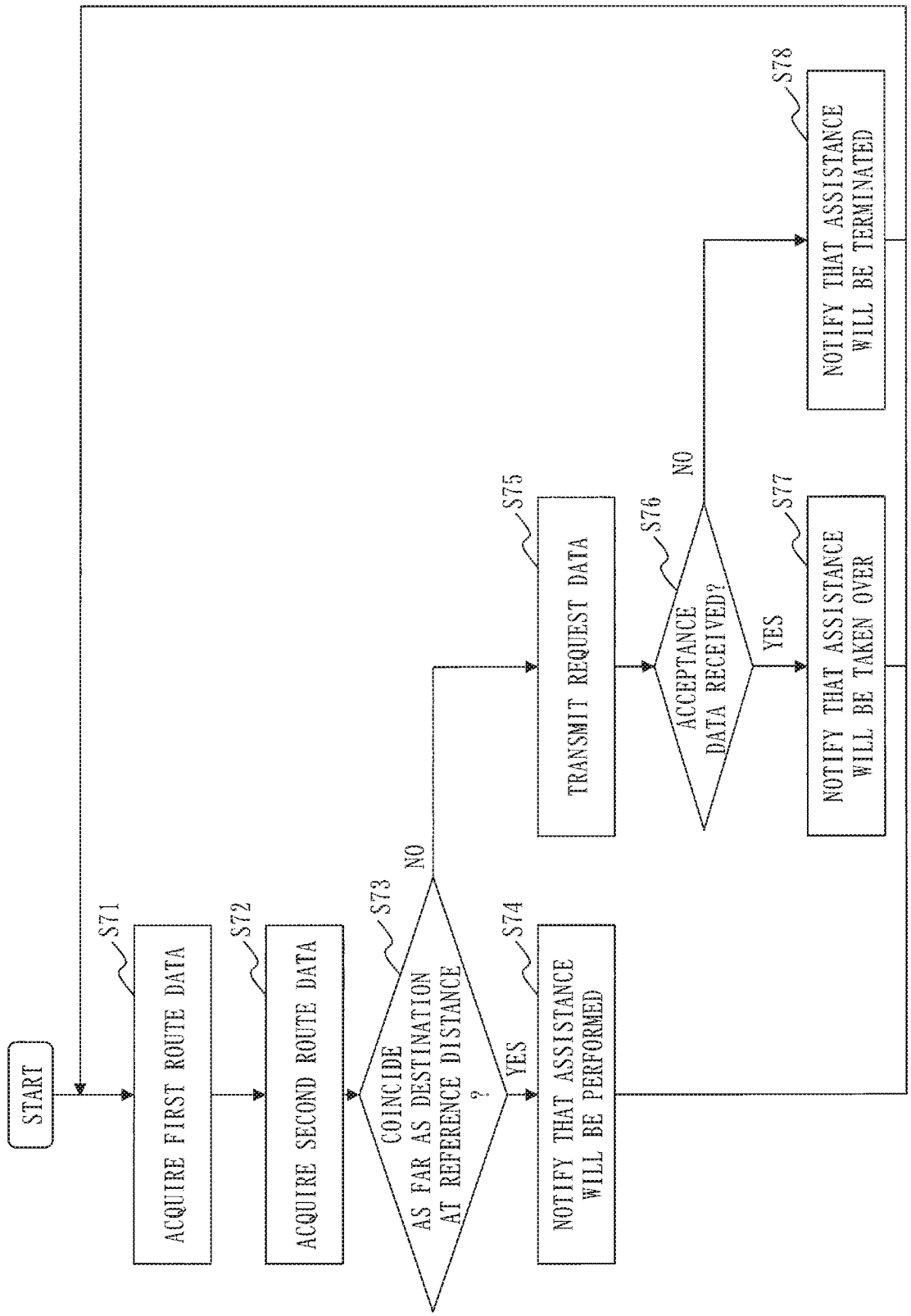
FIG. 17 is a flowchart of an assistance range specifying process according to Embodiment 2.
Figure 18:
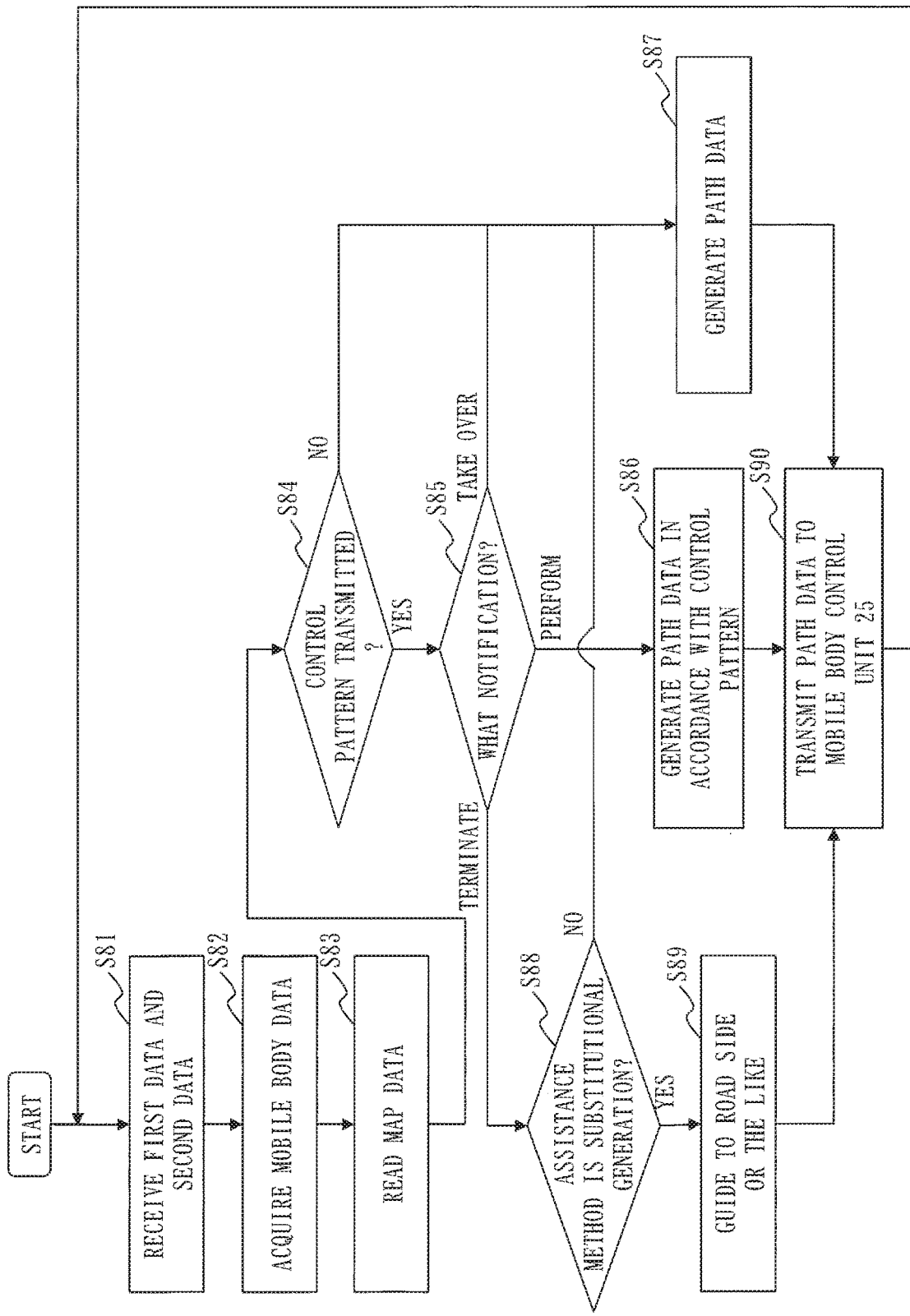
FIG. 18 is a flowchart of a path generation process according to Embodiment 2.

The path generation unit 24 determines which one is notified, among execution of the assistance (step S74 of FIG. 17), takeover of the assistance (step S77 of FIG. 17), and termination of the assistance (step S78 of FIG. 17).

If execution of the assistance is notified, the path generation unit 24 advances the processing to step S86. If takeover of the assistance is notified, the path generation unit 24 advances the processing to step S87. If termination of the assistance is notified, the path generation unit 24 advances the processing to step S88.

(Step S88: Termination Control Process)

The path generation unit 24 determines whether or not the assistance method is substitutional generation of the moving path. That is, the path generation unit 24 determines whether or not guidance data need be generated.

If the assistance method is substitutional generation of the moving path, the path generation unit 24 advances the processing to step S89. If the assistance method is not substitutional generation of the moving path, the path generation unit 24 advances the processing to step S87.

(Step S89: Assistance Termination Process)

If the guidance data has been generated, the path generation unit 24 generates guidance data indicating a moving path to a location such as a road side where the peripheral body 200 can stop safely.

That is, if the assistance method is not substitutional generation of the moving path, the path generation unit 24 terminates the assistance immediately. If the assistance method is substitutional generation of the moving path, the path generation unit 24 generates guidance data and thereby guides the peripheral body 200 to a road side or the like, and then terminates the assistance.

Effect of Embodiment 2

As has been described above, the driving assistance device 10 according to Embodiment 2 determines the range of assistance to the peripheral body 200 based on the moving route of the mobile body 100 to the destination and the moving route of the peripheral body 200 to the destination. By this, it is possible to assist the peripheral body 200 within a range not causing overload to the mobile body 100.

Also, the driving assistance device 10 according to Embodiment 2 takes over the assistance to the peripheral body 200 by mediation with another peripheral body 300. This enables the peripheral body 200 to continue autonomous driving while accepting assistance from a plurality of movable bodies in turn.

\*\*\*Other Configurations\*\*\*

<Modification 9>

In another embodiment, the first route data is acquired from an external device such as a navigation device via the communication interface 14. Alternatively, the first route data may be generated by the driving assistance device 10.

Embodiments of the present invention have been described. Of these embodiments and modifications, some may be practiced in combination. Any one or some of the embodiments and modifications may be practiced only partly. The present invention is not limited to the above embodiments and modifications, and various changes may be made in the present invention where necessary.

REFERENCE SIGNS LIST

10: driving assistance device; 11: processor; 12: memory; 13: storage; 14: communication interface; 15: sensor interface; 16: display interface; 17: processing circuit; 21: recognition unit; 22: abnormality detection unit; 23: assistance determination unit; 24: path generation unit; 25: mobile body control unit; 26: assistance range specifying unit; 31: pattern storage unit; 32: map storage unit; 41: sensor; 51: sensor; 100: mobile body; 200: peripheral body; 300: peripheral body

The invention claimed is:

1. A driving assistance device of a main vehicle, the driving assistance device comprising:
    processing circuitry to:
        detect whether an abnormality has occurred in a sensor mounted in a nearby vehicle moving on a periphery of the main vehicle; and
        in response to detecting the abnormality of the sensor of the nearby vehicle while the main vehicle is in a non-sensing area of the sensor of the nearby vehicle, generate path data indicating a moving path of the main vehicle from the non-sensing area to the sensing area of the sensor of the nearby vehicle whose abnormality has been detected, to enable the main vehicle to move to and monitor the sensing area of the nearby vehicle, which is failed to be monitored by the nearby vehicle due to the abnormality of the sensor, and thereby to assist autonomous driving of the nearby vehicle.

2. The driving assistance device according to claim 1, wherein the processing circuitry generates the path data such that the main vehicle moves within a place corresponding to the sensing area around the nearby vehicle.

3. The driving assistance device according to claim 1, wherein the processing circuitry generates the path data such that the main vehicle moves within such a place that another nearby vehicle is interfered with from entering the sensing area.

4. The driving assistance device according to claim 1, wherein the processing circuitry generates the path data such that the main vehicle moves within such a place that a sensor mounted in the main vehicle can sense the sensing area.

5. The driving assistance device according to claim 4, wherein the processing circuitry transmits sensing data, obtained by sensing the sensing area using the sensor mounted in the main vehicle, to the nearby vehicle.

6. The driving assistance device according to claim 5, wherein the processing circuitry
generates guidance data indicating a moving path of the nearby vehicle, and
transmits the guidance data to the nearby vehicle.

7. The driving assistance device according to claim 5, wherein the processing circuitry transmits the sensing data at an assistance timing that is set to obtain information from the sensing area.

8. The driving assistance device according to claim 1, wherein, upon reception of guidance data indicating the moving path of the main vehicle from the nearby vehicle when the abnormality has not occurred in the sensor of the nearby vehicle, the processing circuitry treats the guidance data as the path data.

9. The driving assistance device according to claim 1, wherein the processing circuitry
specifies a range of assistance to the nearby vehicle based on a planned moving route of the main vehicle to a destination and a planned moving route of the nearby vehicle to a destination, and
generates path data corresponding to the sensing area, concerning the specified range.

10. The driving assistance device according to claim 1, wherein the processing circuitry generates the path data to correspond to the sensing area and a type of a sensor in which the abnormality has been detected.

11. A driving assistance method comprising:
detecting an abnormality in a sensor mounted in a nearby vehicle moving on a periphery of a main vehicle; and
in response to detecting the abnormality of the sensor of the nearby vehicle while the main vehicle is in a non-sensing area of the sensor of the nearby vehicle, generating path data indicating a moving path of the main vehicle from the non-sensing area to a sensing area of the sensor of the nearby vehicle whose abnormality has been detected, to enable the main vehicle to move to and monitor the sensing area, which is failed to be monitored by the nearby vehicle due to the abnormality of the sensor, and thereby to assist autonomous driving of the nearby vehicle.

12. A non-transitory computer readable medium storing a driving assistance program which causes a computer to execute:
detecting an abnormality in a sensor mounted in a nearby vehicle moving on a periphery of a main vehicle; and
in response to detecting the abnormality of the sensor of the nearby vehicle while the main vehicle is in a non-sensing area of the sensor of the nearby vehicle, generating path data indicating a moving path of the main vehicle from the non-sensing area to a sensing area of the sensor of the nearby vehicle whose abnormality has been detected, to enable the main vehicle to move to and monitor the sensing area, which is failed to be monitored by the nearby vehicle due to the abnormality of the sensor, and thereby to assist autonomous driving of the nearby vehicle.

* * * * *